United States Patent
Van Wiemeersch et al.

(10) Patent No.: US 11,275,368 B2
(45) Date of Patent: Mar. 15, 2022

(54) KEY FOBS FOR VEHICLE REMOTE PARK-ASSIST

(71) Applicant: Ford Global Technologies, LLC, Dearborn, MI (US)

(72) Inventors: John Robert Van Wiemeersch, Novi, MI (US); Erick Michael Lavoie, Dearborn, MI (US); Daniel M. King, Northville, MI (US); Ali Hassani, Ann Arbor, MI (US); Alyssa Chatten, Huntington Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 157 days.

(21) Appl. No.: 16/372,340

(22) Filed: Apr. 1, 2019

(65) Prior Publication Data
US 2020/0310407 A1 Oct. 1, 2020

(51) Int. Cl.
*G05D 1/00* (2006.01)
*B60R 25/24* (2013.01)
(Continued)

(52) U.S. Cl.
CPC .......... *G05D 1/0016* (2013.01); *B60R 25/04* (2013.01); *B60R 25/1003* (2013.01);
(Continued)

(58) Field of Classification Search
CPC .. G05D 1/0016; B60R 25/241; B60R 25/209; B60R 25/04; B60R 2025/1013; B60R 25/1003
See application file for complete search history.

(56) References Cited

U.S. PATENT DOCUMENTS 5,959,724 A 9/1999 Izumi
6,275,754 B1 8/2001 Shimizu
(Continued)

FOREIGN PATENT DOCUMENTS

CN 101929921 A 12/2010
CN 103818204 A 5/2014
(Continued)

OTHER PUBLICATIONS

Hyundai, Remote Start Owner's Guide, 2010, Hyundai, p. 5 (Year: 2010).*
(Continued)

*Primary Examiner* — Alan D Hutchinson
*Assistant Examiner* — Andy Schneider
(74) *Attorney, Agent, or Firm* — Frank Lollo; Eversheds Sutherland (US) LLP

(57) ABSTRACT

Method and apparatus are disclosed for key fobs for vehicle remote park-assist. An example key fob for a vehicle includes buttons including a lock button, an unlock button, and a trigger button. The example key fob also includes an antenna and a controller. The controller is configured to transmit, via the antenna, a lock signal responsive to detecting the lock button is pressed. The controller is configured to transmit, via the antenna, an unlock signal responsive to detecting the unlock button is pressed. The controller is configured to transmit, via the antenna, a remote-start signal responsive to detecting a remote-start combination of the buttons is pressed. The controller is configured to transmit, via the antenna, a remote park-assist (RePA) signal to initiate RePA of the vehicle responsive to detecting a RePA combination of the buttons is pressed.

19 Claims, 6 Drawing Sheets

(51) Int. Cl.
　　　*B60R 25/20*　　　(2013.01)
　　　*B60R 25/04*　　　(2013.01)
　　　*B60R 25/10*　　　(2013.01)
　　　*E05B 81/76*　　　(2014.01)
(52) U.S. Cl.
　　　CPC .......... *B60R 25/209* (2013.01); *B60R 25/241* (2013.01); *B60R 2025/1013* (2013.01); *E05B 81/76* (2013.01)

(56) References Cited

U.S. PATENT DOCUMENTS

| | | |
|---|---|---|
| 6,356,828 B1 | 3/2002 | Shimizu |
| 6,452,617 B1 | 9/2002 | Bates |
| 6,476,730 B2 | 11/2002 | Kakinami |
| 6,477,260 B1 | 11/2002 | Shimomura |
| 6,657,555 B2 | 12/2003 | Shimizu |
| 6,683,539 B2 | 1/2004 | Trajkovic |
| 6,724,322 B2 | 4/2004 | Tang et al. |
| 6,744,364 B2 | 6/2004 | Wathen |
| 6,768,420 B2 | 7/2004 | McCarthy |
| 6,801,855 B1 | 10/2004 | Walters |
| 6,850,844 B1 | 1/2005 | Walters |
| 6,850,148 B2 | 2/2005 | Masudaya |
| 6,927,685 B2 | 8/2005 | Wathen |
| 6,997,048 B2 | 2/2006 | Komatsu |
| 7,042,332 B2 | 5/2006 | Takamura |
| 7,123,167 B2 | 10/2006 | Staniszewski |
| 7,307,655 B1 | 12/2007 | Okamoto |
| 7,663,508 B2 | 2/2010 | Teshima |
| 7,737,866 B2 | 6/2010 | Wu |
| 7,813,844 B2 | 10/2010 | Gensler et al. |
| 7,825,828 B2 | 11/2010 | Watanabe |
| 7,834,778 B2 | 11/2010 | Browne |
| 7,847,709 B2 | 12/2010 | McCall |
| 7,850,078 B2 | 12/2010 | Christenson |
| 7,924,483 B2 | 4/2011 | Smith |
| 8,035,503 B2 | 10/2011 | Partin |
| 8,054,169 B2 | 11/2011 | Bettecken |
| 8,098,146 B2 | 1/2012 | Petrucelli |
| 8,126,450 B2 | 2/2012 | Howarter |
| 8,164,628 B2 | 4/2012 | Stein |
| 8,180,524 B2 | 5/2012 | Eguchi |
| 8,180,547 B2 | 5/2012 | Prasad |
| 8,224,313 B2 | 7/2012 | Howarter |
| 8,229,645 B2 | 7/2012 | Lee |
| 8,242,884 B2 | 8/2012 | Holcomb |
| 8,335,598 B2 | 12/2012 | Dickerhoof |
| 8,401,235 B2 | 3/2013 | Lee |
| 8,493,236 B2 | 7/2013 | Boehme |
| 8,538,408 B2 | 9/2013 | Howarter |
| 8,542,130 B2 | 9/2013 | Lavoie |
| 8,552,856 B2 | 10/2013 | McRae |
| 8,587,681 B2 | 11/2013 | Guidash |
| 8,594,616 B2 | 11/2013 | Gusikhin |
| 8,599,043 B2 | 12/2013 | Kadowaki |
| 8,618,945 B2 | 12/2013 | Furuta |
| 8,645,015 B2 | 2/2014 | Oetiker |
| 8,655,551 B2 | 2/2014 | Danz |
| 8,692,773 B2 | 4/2014 | You |
| 8,706,350 B2 | 4/2014 | Talty |
| 8,725,315 B2 | 5/2014 | Talty |
| 8,742,947 B2 | 6/2014 | Nakazono |
| 8,744,684 B2 | 6/2014 | Hong |
| 8,780,257 B2 | 7/2014 | Gidon |
| 8,787,868 B2 | 7/2014 | Leblanc |
| 8,825,262 B2 | 9/2014 | Lee |
| 8,933,778 B2 | 1/2015 | Birkel |
| 8,957,786 B2 | 2/2015 | Stempnik |
| 8,994,548 B2 | 3/2015 | Gaboury |
| 8,995,914 B2 | 3/2015 | Nishidai |
| 9,008,860 B2 | 4/2015 | Waldock |
| 9,014,920 B1 | 4/2015 | Torres |
| 9,078,200 B2 | 7/2015 | Wuergler |
| 9,086,879 B2 | 7/2015 | Gautama |
| 9,141,503 B1 | 9/2015 | Chen |
| 9,147,065 B2 | 9/2015 | Lauer |
| 9,154,920 B2 | 10/2015 | O'Brien |
| 9,168,955 B2 | 10/2015 | Noh |
| 9,193,387 B2 | 11/2015 | Auer |
| 9,225,531 B2 | 12/2015 | Hachey |
| 9,230,439 B2 | 1/2016 | Boulay |
| 9,233,710 B2 | 1/2016 | Lavoie |
| 9,273,966 B2 | 3/2016 | Bartels |
| 9,275,208 B2 | 3/2016 | Protopapas |
| 9,283,960 B1 | 3/2016 | Lavoie |
| 9,286,803 B2 | 3/2016 | Tippelhofer |
| 9,302,675 B2 | 4/2016 | Schilling et al. |
| 9,318,022 B2 | 4/2016 | Barth |
| 9,379,567 B2 | 6/2016 | Kracker |
| 9,381,859 B2 | 7/2016 | Nagata |
| 9,429,657 B2 | 8/2016 | Sidhu |
| 9,429,947 B1 | 8/2016 | Wengreen |
| 9,454,251 B1 | 9/2016 | Guihot |
| 9,469,247 B2 | 10/2016 | Juneja |
| 9,493,187 B2 | 11/2016 | Pilutti |
| 9,506,774 B2 | 11/2016 | Shutko |
| 9,511,799 B2 | 12/2016 | Lavoie |
| 9,522,675 B1 | 12/2016 | You |
| 9,529,519 B2 | 12/2016 | Blumenberg |
| 9,557,741 B1 | 1/2017 | Elie |
| 9,563,990 B2 | 2/2017 | Khan |
| 9,595,145 B2 | 3/2017 | Avery |
| 9,598,051 B2 | 3/2017 | Okada |
| 9,606,241 B2 | 3/2017 | Varoglu |
| 9,616,923 B2 | 4/2017 | Lavoie |
| 9,637,117 B1 | 5/2017 | Gusikhin |
| 9,651,655 B2 | 5/2017 | Feldman |
| 9,656,690 B2 | 5/2017 | Shen |
| 9,666,040 B2 | 5/2017 | Flaherty |
| 9,688,306 B2 | 6/2017 | McClain |
| 9,701,280 B2 | 7/2017 | Schussmann |
| 9,712,977 B2 | 7/2017 | Tu |
| 9,715,816 B1 | 7/2017 | Adler |
| 9,725,069 B2 | 8/2017 | Krishnan |
| 9,731,714 B2 | 8/2017 | Kiriya |
| 9,731,764 B2 | 8/2017 | Baek |
| 9,754,173 B2 | 9/2017 | Kim |
| 9,809,218 B2 | 11/2017 | Elie |
| 9,811,085 B1 | 11/2017 | Hayes |
| 9,842,444 B2 | 12/2017 | Van Wiemeersch et al. |
| 9,845,070 B2 | 12/2017 | Petel et al. |
| 9,846,431 B2 | 12/2017 | Petel |
| 9,914,333 B2 | 3/2018 | Shank |
| 9,921,743 B2 | 3/2018 | Bryant |
| 9,946,255 B2 | 4/2018 | Matters et al. |
| 9,959,763 B2 | 5/2018 | Miller |
| 9,971,130 B1 | 5/2018 | Lin |
| 9,975,504 B2 | 5/2018 | Dalke |
| 10,019,001 B2 | 7/2018 | Dang Van Nhan |
| 10,032,276 B1 | 7/2018 | Liu |
| 10,040,482 B1 | 8/2018 | Jung |
| 10,043,076 B1 | 8/2018 | Zhang |
| 10,131,347 B2 | 11/2018 | Kim |
| 10,192,113 B1 | 1/2019 | Liu |
| 10,246,055 B2 | 4/2019 | Farges |
| 10,268,341 B2 | 4/2019 | Kocienda |
| 2003/0060972 A1 | 3/2003 | Kakinami |
| 2003/0098792 A1 | 5/2003 | Edwards |
| 2003/0133027 A1 | 7/2003 | Itoh |
| 2005/0030156 A1 | 2/2005 | Alfonso |
| 2005/0068450 A1 | 3/2005 | Steinberg |
| 2005/0099275 A1 | 5/2005 | Kamdar |
| 2006/0010961 A1 | 1/2006 | Gibson |
| 2006/0211368 A1* | 9/2006 | Wisnia ............. B60R 25/209 455/3.06 |
| 2006/0227010 A1 | 10/2006 | Berstis |
| 2006/0235590 A1 | 10/2006 | Bolourchi |
| 2007/0230944 A1 | 10/2007 | Georgiev |
| 2008/0027591 A1 | 1/2008 | Lenser |
| 2008/0117079 A1* | 5/2008 | Hassan ............. B60R 25/045 340/901 |
| 2008/0154464 A1 | 6/2008 | Sasajima |
| 2008/0154613 A1 | 6/2008 | Haulick |

(56) References Cited

U.S. PATENT DOCUMENTS

| | | |
|---|---|---|
| 2008/0238643 A1 | 10/2008 | Malen |
| 2008/0306683 A1 | 12/2008 | Ando |
| 2009/0096753 A1 | 4/2009 | Lim |
| 2009/0098907 A1 | 4/2009 | Huntzicker |
| 2009/0115639 A1 | 5/2009 | Proefke |
| 2009/0125181 A1 | 5/2009 | Luke |
| 2009/0125311 A1 | 5/2009 | Haulick |
| 2009/0128315 A1 | 5/2009 | Griesser |
| 2009/0146813 A1 | 6/2009 | Nuno |
| 2009/0174574 A1 | 7/2009 | Endo |
| 2009/0241031 A1 | 9/2009 | Gamaley |
| 2009/0289813 A1 | 11/2009 | Kwiecinski |
| 2009/0309970 A1 | 12/2009 | Ishii |
| 2009/0313095 A1 | 12/2009 | Hurpin |
| 2010/0025942 A1 | 2/2010 | Mangaroo |
| 2010/0061564 A1 | 3/2010 | Clemow |
| 2010/0114471 A1 | 5/2010 | Sugiyama |
| 2010/0114488 A1 | 5/2010 | Khamharn |
| 2010/0136944 A1 | 6/2010 | Taylor |
| 2010/0152972 A1 | 6/2010 | Attard |
| 2010/0156672 A1 | 6/2010 | Yoo |
| 2010/0245277 A1 | 9/2010 | Nakao |
| 2010/0259420 A1 | 10/2010 | Von Reyher |
| 2011/0071725 A1 | 3/2011 | Kleve |
| 2011/0082613 A1 | 4/2011 | Oetiker |
| 2011/0190972 A1 | 8/2011 | Timmons |
| 2011/0205088 A1 | 8/2011 | Baker |
| 2011/0253463 A1 | 10/2011 | Smith |
| 2011/0309922 A1 | 12/2011 | Ghabra |
| 2012/0007741 A1 | 1/2012 | Laffey |
| 2012/0072067 A1 | 3/2012 | Jecker |
| 2012/0083960 A1 | 4/2012 | Zhu |
| 2012/0173080 A1 | 7/2012 | Cluff |
| 2012/0176332 A1 | 7/2012 | Fujibayashi |
| 2012/0271500 A1 | 10/2012 | Tsimhoni |
| 2012/0303258 A1 | 11/2012 | Pampus |
| 2012/0323643 A1 | 12/2012 | Volz |
| 2012/0323700 A1 | 12/2012 | Aleksandrovich |
| 2013/0021171 A1 | 1/2013 | Hsu |
| 2013/0024202 A1 | 1/2013 | Harris |
| 2013/0043989 A1 | 2/2013 | Niemz |
| 2013/0073119 A1 | 3/2013 | Huger |
| 2013/0109342 A1 | 5/2013 | Welch |
| 2013/0110342 A1 | 5/2013 | Wuttke |
| 2013/0113936 A1 | 5/2013 | Cohen |
| 2013/0124061 A1 | 5/2013 | Khanafer |
| 2013/0145441 A1 | 6/2013 | Mujumdar |
| 2013/0211623 A1 | 8/2013 | Thompson |
| 2013/0231824 A1 | 9/2013 | Wilson |
| 2013/0289825 A1 | 10/2013 | Noh |
| 2013/0314502 A1 | 11/2013 | Urbach |
| 2013/0317944 A1 | 11/2013 | Huang |
| 2014/0052323 A1 | 2/2014 | Reichel |
| 2014/0095994 A1 | 4/2014 | Kim |
| 2014/0096051 A1 | 4/2014 | Boblett |
| 2014/0121930 A1 | 5/2014 | Allexi |
| 2014/0147032 A1 | 5/2014 | Yous |
| 2014/0156107 A1 | 6/2014 | Karasawa |
| 2014/0188339 A1 | 7/2014 | Moon |
| 2014/0222252 A1* | 8/2014 | Matters ............... G05D 1/0011 701/2 |
| 2014/0240502 A1 | 8/2014 | Strauss |
| 2014/0282931 A1 | 9/2014 | Protopapas |
| 2014/0297120 A1 | 10/2014 | Cotgrove |
| 2014/0300504 A1 | 10/2014 | Shaffer |
| 2014/0303839 A1 | 10/2014 | Filev |
| 2014/0320318 A1 | 10/2014 | Victor |
| 2014/0327736 A1 | 11/2014 | DeJohn |
| 2014/0350804 A1 | 11/2014 | Park |
| 2014/0350855 A1 | 11/2014 | Vishnuvajhala |
| 2014/0365108 A1 | 12/2014 | You |
| 2014/0365126 A1 | 12/2014 | Vulcano |
| 2015/0022468 A1 | 1/2015 | Cha |
| 2015/0039173 A1 | 2/2015 | Beaurepaire |
| 2015/0039224 A1 | 2/2015 | Tuukkanen |
| 2015/0048927 A1 | 2/2015 | Simmons |
| 2015/0066545 A1 | 3/2015 | Kotecha |
| 2015/0077522 A1 | 3/2015 | Suzuki |
| 2015/0088360 A1 | 3/2015 | Bonnet |
| 2015/0091741 A1 | 4/2015 | Stefik |
| 2015/0109116 A1 | 4/2015 | Grimm |
| 2015/0116079 A1 | 4/2015 | Mishra |
| 2015/0123818 A1 | 5/2015 | Sellschopp |
| 2015/0127208 A1 | 5/2015 | Jecker |
| 2015/0149265 A1 | 5/2015 | Huntzicker |
| 2015/0151789 A1 | 6/2015 | Lee |
| 2015/0153178 A1 | 6/2015 | Koo |
| 2015/0161890 A1 | 6/2015 | Huntzicker |
| 2015/0163649 A1 | 6/2015 | Chen |
| 2015/0197278 A1 | 7/2015 | Boos |
| 2015/0203111 A1 | 7/2015 | Bonnet |
| 2015/0203156 A1 | 7/2015 | Hafner |
| 2015/0210317 A1 | 7/2015 | Hafner |
| 2015/0217693 A1 | 8/2015 | Pliefke |
| 2015/0219464 A1 | 8/2015 | Beaurepaire |
| 2015/0220791 A1 | 8/2015 | Wu |
| 2015/0226146 A1 | 8/2015 | Elwart |
| 2015/0274016 A1 | 10/2015 | Kinoshita |
| 2015/0286340 A1 | 10/2015 | Send |
| 2015/0329110 A1 | 11/2015 | Stefan |
| 2015/0344028 A1 | 12/2015 | Gieseke |
| 2015/0346727 A1 | 12/2015 | Ramanujam |
| 2015/0360720 A1 | 12/2015 | Li |
| 2015/0365401 A1 | 12/2015 | Brown |
| 2015/0371541 A1 | 12/2015 | Korman |
| 2015/0375741 A1 | 12/2015 | Kiriya |
| 2015/0375742 A1 | 12/2015 | Gebert |
| 2016/0012653 A1 | 1/2016 | Soroka |
| 2016/0012726 A1 | 1/2016 | Wang |
| 2016/0018821 A1 | 1/2016 | Akita |
| 2016/0055749 A1 | 2/2016 | Nicoll |
| 2016/0153778 A1 | 2/2016 | Singh |
| 2016/0062354 A1 | 3/2016 | Li |
| 2016/0068158 A1 | 3/2016 | Elwart |
| 2016/0068187 A1 | 3/2016 | Hata |
| 2016/0075369 A1 | 3/2016 | Lavoie |
| 2016/0090055 A1 | 3/2016 | Breed |
| 2016/0107689 A1 | 4/2016 | Lee |
| 2016/0112846 A1 | 4/2016 | Siswick |
| 2016/0114726 A1 | 4/2016 | Nagata |
| 2016/0117926 A1 | 4/2016 | Akavaram |
| 2016/0127664 A1 | 5/2016 | Bruder |
| 2016/0139244 A1 | 5/2016 | Holtman |
| 2016/0144857 A1 | 5/2016 | Ohshima |
| 2016/0152263 A1 | 6/2016 | Singh |
| 2016/0170494 A1 | 6/2016 | Bonnet |
| 2016/0185389 A1 | 6/2016 | Ishijima |
| 2016/0189435 A1 | 6/2016 | Beaurepaire |
| 2016/0207528 A1 | 7/2016 | Stefan |
| 2016/0224025 A1 | 8/2016 | Petel |
| 2016/0229452 A1 | 8/2016 | Lavoie |
| 2016/0236680 A1 | 8/2016 | Lavoie |
| 2016/0249294 A1 | 8/2016 | Lee |
| 2016/0257304 A1 | 9/2016 | Lavoie |
| 2016/0272244 A1 | 9/2016 | Imai |
| 2016/0282442 A1 | 9/2016 | O'Mahony |
| 2016/0284217 A1 | 9/2016 | Lee |
| 2016/0288657 A1 | 10/2016 | Tokura |
| 2016/0300417 A1 | 10/2016 | Hatton |
| 2016/0304087 A1 | 10/2016 | Noh |
| 2016/0304088 A1 | 10/2016 | Barth |
| 2016/0349362 A1 | 10/2016 | Rohr |
| 2016/0321445 A1 | 11/2016 | Turgeman |
| 2016/0321926 A1 | 11/2016 | Mayer |
| 2016/0334797 A1 | 11/2016 | Ross |
| 2016/0347280 A1 | 12/2016 | Daman |
| 2016/0355125 A1 | 12/2016 | Herbert |
| 2016/0357354 A1 | 12/2016 | Chen |
| 2016/0358474 A1 | 12/2016 | Uppal |
| 2016/0368489 A1 | 12/2016 | Aich |
| 2016/0371607 A1 | 12/2016 | Rosen |
| 2016/0371691 A1 | 12/2016 | Kang |
| 2017/0001650 A1 | 1/2017 | Park |
| 2017/0008563 A1 | 1/2017 | Popken |

(56) References Cited

U.S. PATENT DOCUMENTS

| | | | |
|---|---|---|---|
| 2017/0026198 A1 | 1/2017 | Ochiai |
| 2017/0028985 A1 | 2/2017 | Kiyokawa |
| 2017/0030722 A1 | 2/2017 | Kojo |
| 2017/0032593 A1 | 2/2017 | Patel |
| 2017/0072947 A1 | 3/2017 | Lavoie |
| 2017/0073004 A1 | 3/2017 | Shepard |
| 2017/0076603 A1 | 3/2017 | Bostick |
| 2017/0097504 A1 | 4/2017 | Takamatsu |
| 2017/0116790 A1 | 4/2017 | Kusens |
| 2017/0123423 A1 | 5/2017 | Sako |
| 2017/0129537 A1 | 5/2017 | Kim |
| 2017/0129538 A1 | 5/2017 | Stefan |
| 2017/0132482 A1 | 5/2017 | Kim |
| 2017/0144654 A1 | 5/2017 | Sham |
| 2017/0144656 A1 | 5/2017 | Kim |
| 2017/0147995 A1 | 5/2017 | Kalimi |
| 2017/0168479 A1 | 6/2017 | Dang |
| 2017/0192428 A1 | 7/2017 | Vogt |
| 2017/0200369 A1 | 7/2017 | Miller |
| 2017/0203763 A1 | 7/2017 | Yamada |
| 2017/0208438 A1 | 7/2017 | Dickow |
| 2017/0297385 A1 | 10/2017 | Kim |
| 2017/0297620 A1 | 10/2017 | Lavoie |
| 2017/0301241 A1 | 10/2017 | Urhahne et al. |
| 2017/0308075 A1 | 10/2017 | Whitaker et al. |
| 2017/0327081 A1* | 11/2017 | Hiatt ........................ G04G 9/00 |
| 2017/0336788 A1 | 11/2017 | Iagnemma |
| 2017/0357317 A1 | 12/2017 | Chaudhri |
| 2017/0371514 A1 | 12/2017 | Cullin |
| 2018/0015878 A1 | 1/2018 | McNew |
| 2018/0024559 A1 | 1/2018 | Seo |
| 2018/0029591 A1 | 2/2018 | Lavoie |
| 2018/0029641 A1 | 2/2018 | Solar |
| 2018/0039264 A1 | 2/2018 | Messner et al. |
| 2018/0043884 A1 | 2/2018 | Johnson |
| 2018/0056939 A1 | 3/2018 | Van Roermund et al. |
| 2018/0056989 A1 | 3/2018 | Donald |
| 2018/0082588 A1 | 3/2018 | Hoffman, Jr |
| 2018/0088330 A1 | 3/2018 | Giannuzzi |
| 2018/0093663 A1 | 4/2018 | Kim |
| 2018/0105165 A1 | 4/2018 | Alarcon |
| 2018/0105167 A1 | 4/2018 | Kim |
| 2018/0148094 A1 | 5/2018 | Mukaiyama |
| 2018/0174460 A1 | 6/2018 | Jung |
| 2018/0189971 A1 | 7/2018 | Hildreth |
| 2018/0194344 A1 | 7/2018 | Wang |
| 2018/0196963 A1 | 7/2018 | Bandiwdekar |
| 2018/0224863 A1 | 8/2018 | Fu |
| 2018/0236957 A1 | 8/2018 | Nam |
| 2018/0284802 A1 | 10/2018 | Tsai |
| 2018/0286072 A1 | 10/2018 | Tsai |
| 2018/0339654 A1 | 11/2018 | Kim |
| 2018/0345851 A1 | 12/2018 | Lavoie |
| 2018/0364731 A1 | 12/2018 | Liu |
| 2019/0005445 A1 | 1/2019 | Bahrainwala |
| 2019/0042003 A1 | 2/2019 | Parazynski |
| 2019/0066503 A1 | 2/2019 | Li |
| 2019/0103027 A1 | 4/2019 | Wheeler |
| 2019/0137990 A1 | 5/2019 | Golgiri |

FOREIGN PATENT DOCUMENTS

| | | | |
|---|---|---|---|
| CN | 104183153 A | 12/2014 |
| CN | 104485013 A | 4/2015 |
| CN | 104691544 A | 6/2015 |
| CN | 103049159 B | 7/2015 |
| CN | 105513412 A | 4/2016 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106598630 A | 4/2017 |
| CN | 106782572 A | 5/2017 |
| CN | 106945662 A | 7/2017 |
| CN | 104290751 B | 1/2018 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009024083 A1 | 7/2010 |
| DE | 102016224529 A1 | 3/2011 |
| DE | 102016226008 A1 | 3/2011 |
| DE | 102009060169 A1 | 6/2013 |
| DE | 102011080148 A1 | 7/2013 |
| DE | 102012200725 A1 | 9/2013 |
| DE | 102009051055 A1 | 10/2013 |
| DE | 102010034129 B4 | 10/2013 |
| DE | 102011122421 A1 | 6/2014 |
| DE | 102012008858 A1 | 6/2014 |
| DE | 102013016342 A1 | 1/2015 |
| DE | 102013019904 A1 | 2/2015 |
| DE | 102012215218 A1 | 4/2015 |
| DE | 102012222972 A1 | 5/2015 |
| DE | 102013004214 A1 | 5/2015 |
| DE | 102013019771 A1 | 12/2015 |
| DE | 102013213064 A1 | 2/2016 |
| DE | 102014007915 A1 | 2/2016 |
| DE | 102014011802 A1 | 2/2016 |
| DE | 102014009077 A1 | 4/2016 |
| DE | 102014226458 A1 | 6/2016 |
| DE | 102014011864 A1 | 12/2016 |
| DE | 102014015655 A1 | 5/2017 |
| DE | 102014111570 A1 | 6/2017 |
| DE | 102016214433 A1 | 6/2017 |
| DE | 102015209976 A1 | 7/2017 |
| DE | 102015221224 A1 | 12/2017 |
| DE | 102016011916 A1 | 2/2018 |
| DE | 102016125282 A1 | 6/2018 |
| DE | 102016211021 A1 | 6/2018 |
| EP | 2653367 A1 | 6/2000 |
| EP | 2289768 A2 | 10/2013 |
| EP | 2620351 B1 | 12/2015 |
| EP | 2295281 A1 | 3/2016 |
| EP | 2135788 B1 | 6/2016 |
| FR | 3021798 A1 | 12/2012 |
| GB | 2534471 A | 10/2000 |
| GB | 2344481 A | 12/2012 |
| GB | 2497836 A | 9/2014 |
| GB | 2481324 A | 3/2015 |
| GB | 2517835 A | 5/2016 |
| GB | 2491720 A | 7/2016 |
| JP | 5586450 B2 | 5/2004 |
| JP | 5918683 B2 | 10/2004 |
| JP | 2000293797 A | 7/2005 |
| JP | 2004142543 A | 4/2009 |
| JP | 2016119032 A | 4/2009 |
| JP | 2018052188 A | 1/2010 |
| JP | 2004287884 A | 7/2014 |
| JP | 2005193742 A | 7/2014 |
| JP | 2009090850 A | 6/2016 |
| JP | 2014134082 A | 7/2016 |
| JP | 2014125196 A | 4/2018 |
| KR | 20130106005 A | 6/2006 |
| KR | 20160039460 A | 5/2008 |
| KR | 20160051993 A | 1/2010 |
| KR | 101641267 B | 9/2013 |
| KR | 20090040024 A | 4/2016 |
| KR | 20100006714 A | 5/2016 |
| WO | 2017/112444 A1 | 12/2010 |
| WO | 2017/118510 A1 | 6/2011 |
| WO | 2006/064544 A1 | 11/2011 |
| WO | 2017/125514 A1 | 1/2013 |
| WO | 2008/055567 A1 | 4/2013 |
| WO | 2010/006981 A1 | 8/2013 |
| WO | 2011/141096 A1 | 7/2014 |
| WO | 2013/056959 A1 | 5/2015 |
| WO | 2013/123813 A1 | 12/2015 |
| WO | 2014/103492 A1 | 3/2016 |
| WO | 2015/068032 A1 | 8/2016 |
| WO | 2015/193058 A1 | 9/2016 |
| WO | 2016134822 A1 | 9/2016 |
| WO | 2016/046269 A1 | 4/2017 |

(56) References Cited

FOREIGN PATENT DOCUMENTS

| WO | 2016/128200 A1 | 5/2017 |
|---|---|---|
| WO | 2017/062448 A1 | 6/2017 |
| WO | 2017/073159 A1 | 6/2017 |
| WO | 2017/096307 A1 | 6/2017 |
| WO | 2017/096728 A1 | 7/2017 |
| WO | 2017/097942 A1 | 7/2017 |

OTHER PUBLICATIONS

Alberto Broggi and Elena Cardarelli, Vehicle Detection for Autonomous Parking Using a Soft-Cascade ADA Boost Classifier, Jun. 8, 2014.
Al-Sherbaz, Ali et al., Hybridisation of GNSS with other wireless/sensors technologies on board smartphones to offer seamless outdoors-indoors positioning for LBS applications, Apr. 2016, 3 pages.
Automatically Into the Parking Space—https://www.mercedes-benz.com/en/mercedes-benz/next/automation/automatically-into-the-parking-space/; Oct. 27, 2014.
Bill Howard, Bosch's View Of The Future Car: Truly Keyless Entry, Haptic Feedback, Smart Parking, Cybersecurity, Jan. 9, 2017, 8 Pages.
ChargeItSpot Locations, Find a Phone Charging Station Near You, retrieved at https://chargeitspot.com/locations/ on Nov. 28, 2017.
Core System Requirements Specification (SyRS), Jun. 30, 2011, Research and Innovative Technology Administration.
Daimler AG, Remote Parking Pilot, Mar. 2016 (3 Pages).
Jingbin Liu, IParking: An Intelligent Indoor Location-Based Smartphone Parking Service, Oct. 31, 2012, 15 pages.
Land Rover develops a smartphone remote control for its SUVs, James Vincent, Jun. 18, 2015.
Land Rover, Land Rover Remote Control Via Iphone RC Range Rover Sport Showcase—Autogefühl, Retrieved from https://www.youtube.com/watch?v=4ZaaYNaEFio (at 43 seconds and 1 minute 42 seconds), Sep. 16, 2015.
Perpendicular Parking—https://prezi.com/toqmfyxriksl/perpendicular-parking/.
SafeCharge, Secure Cell Phone Charging Stations & Lockers, retrieved at https://www.thesafecharge.com on Nov. 28, 2017.
Search Report dated Jan. 19, 2018 for GB Patent Application No. 1711988.4 (3 pages).
Search Report dated Jul. 11, 2017 for GB Patent Application No. 1700447.4 (3 Pages).
Search Report dated May 21, 2018 for Great Britain Patent Application No. GB 1800277.4 (5 Pages).
Search Report dated Nov. 22, 2018 for GB Patent Application No. GB 1809829.3 (6 pages).
Search Report dated Nov. 27, 2018 for GB Patent Application No. GB 1809112.4 (3 pages).
Search Report dated Nov. 28, 2017, for GB Patent Application No. GB 1710916.6 (4 Pages).
Search Report dated Nov. 28, 2018 for GB Patent Application No. GB 1809842.6 (5 pages).
Search Report dated Oct. 10, 2018 for GB Patent Application No. 1806499.8 (4 pages).
Tesla Model S Owner's Manual v2018.44. Oct. 29, 2018.
Vehicle's Orientation Measurement Method By Single-Camera Image Using Known-Shaped Planar Object, Nozomu Araki, Takao Sato, Yasuo Konishi and Hiroyuki Ishigaki, 2010.
Tesla, Model S Owner's Manual, Aug. 10, 2018, 197 pages.

* cited by examiner

KEY FOBS FOR VEHICLE REMOTE PARK-ASSIST

CROSS-REFERENCE TO RELATED APPLICATIONS

This application is related to U.S. application Ser. No. 16/372,330, filed on Apr. 1, 2019, and U.S. application Ser. No. 16/372,335, filed on Apr. 1, 2019, which are incorporated herein by reference in their entireties.

TECHNICAL FIELD

The present disclosure generally relates to key fobs and, more specifically, to key fobs for vehicle remote park-assist.

BACKGROUND

Many vehicles include functions in which at least some motive functions of a vehicle are autonomously controlled by the vehicle. For instance, some vehicles include cruise control in which the vehicle controls acceleration and/or deceleration of the vehicle so that a speed of the vehicle is maintained. Further, some vehicles include park-assist features in which the vehicle autonomously and/or semi-autonomously controls motive functions of the vehicle to park the vehicle into a parking spot. For instance, some vehicles include a remote park-assist system that enables a user to initiate park-assist features from a remote location.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for key fobs for vehicle remote park-assist. An example disclosed key fob for a vehicle includes buttons including a lock button, an unlock button, and a trigger button. The example disclosed key fob also includes antennas and a controller. The controller is configured to transmit, via an antenna, a lock signal responsive to detecting the lock button is pressed. The controller is configured to transmit, via the antenna, an unlock signal responsive to detecting the unlock button is pressed. The controller is configured to transmit, via the antenna, a remote-start signal responsive to detecting a remote-start combination of the buttons is pressed. The controller is configured to transmit, via the antenna, a remote park-assist (RePA) signal to initiate RePA of the vehicle responsive to detecting a RePA combination of the buttons is pressed.

An example disclosed vehicle system includes a vehicle. The vehicle includes an autonomy unit and a communication module. The example disclosed vehicle system also includes a key fob. The key fob includes buttons including a lock button and an unlock button, antennas, and a controller. The controller is configured to transmit, via an antenna, a lock signal responsive to the lock button being pressed. The controller is configured to transmit, via the antenna, an unlock signal responsive to the unlock button being pressed. The controller is configured to transmit, via the antenna, a remote park-assist (RePA) signal to initiate the autonomy unit to perform RePA responsive to a RePA combination of the buttons being pressed.

An example disclosed method is for initiating vehicle functions utilizing a key fob that includes buttons. The example disclosed method includes, responsive to detecting, via a processor, that a lock button of the key fob is pressed, transmitting a lock signal via an antenna of the key fob. The example disclosed method includes, responsive to detecting, via the processor, that an unlock button of the key fob is pressed, transmitting an unlock signal via the antenna. The example disclosed method includes, responsive to detecting, via the processor, that a remote-start combination of the buttons is pressed, transmitting a remote-start signal via the antenna. The example disclosed method includes, responsive to detecting, via the processor, that a remote park-assist (RePA) combination of the buttons is pressed, transmitting a RePA signal via the antenna.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
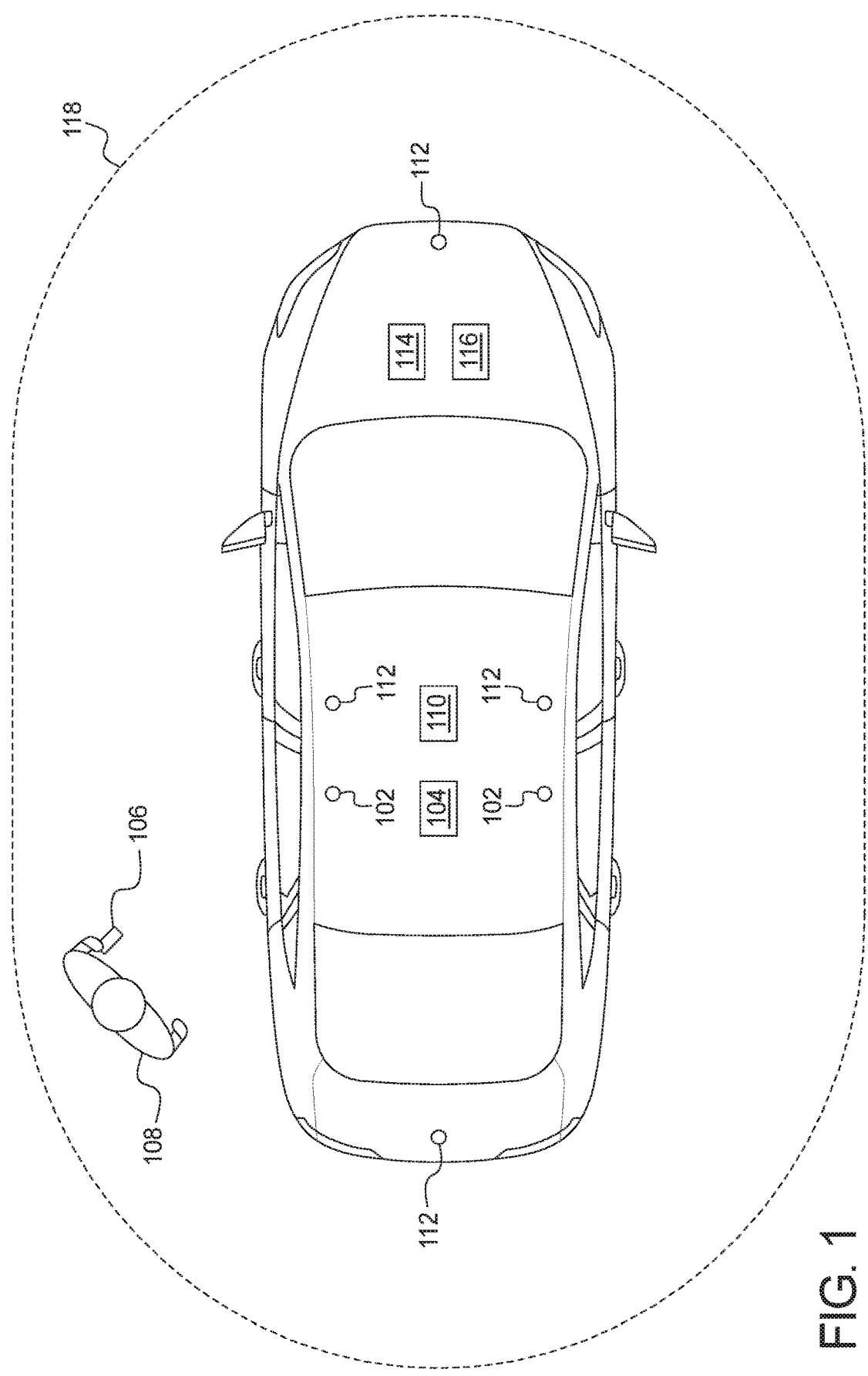
FIG. 1 illustrates a vehicle and a key fob in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Many vehicles include functions in which at least some motive functions of a vehicle are autonomously controlled by the vehicle. For instance, some vehicles include cruise control in which the vehicle controls acceleration and/or deceleration of the vehicle so that a speed of the vehicle is maintained. Further, some vehicles include park-assist features in which the vehicle autonomously and/or semi-autonomously controls motive functions of the vehicle to park the vehicle into a parking spot. For instance, some vehicles include a remote park-assist system that enables a user to initiate park-assist features from a remote location outside the vehicle.

Some remote park-assist systems use both a key fob and a mobile device (a smart phone, a wearable, a smart watch, a tablet, etc.) carried by a user of the vehicle. In some instances, the remote park-assist system uses the key fob to localize and/or determine a distance to the user relative to the vehicle and uses the mobile device to send signals to initiate park-assist motive functions of the vehicle, for example, when a user carries both the key fob and the mobile device to perform a park-assist maneuver. For instance, the key fob may potentially be used for accurately determining a distance between the user and the vehicle based on low-frequency and/or higher frequency communication. Further, the mobile device may potentially be used to initiate the park-assist motive functions to facilitate the simultaneous localization of the user and sending of park-assist instructions. An example remote park-assist system that utilizes both a key fob and a mobile device carried by a user of a vehicle is disclosed in further detail in U.S. application Ser. No. 15/948,428, filed on Apr. 9, 2018, which is incorporated by reference in its entirety. In some such instances, the mobile device potentially may be unavailable for remote park-assist use. For instance, the mobile device may have been misplaced by the user and/or have a discharged battery. Further, some users potentially may find it burdensome to carry two devices, namely the key fob and the mobile device, to initiate remote park-assist for a vehicle.

Example methods and apparatus disclosed herein include a remote park-assist system that enables a key fob to be used for both the localization of a user and the sending of signals to initiate park-assist motive functions. Example key fobs disclosed herein include a plurality of buttons. The key fob is configured to be utilized to initiate remote entry, remote starting, passive entry, passive start, remote park-assist (RePA), and other functions of a vehicle. For example, the key fob sends (i) a remote entry signal upon a user pressing a first combination of the button(s), (ii) a remote start signal upon the user pressing a second combination of button(s), (iii) a remote park-assist signal upon the user pressing a third combination of the button(s). A pressing of a combination of button(s) may include pressing a button once, pressing a button multiple times, and/or pressing a plurality of buttons (e.g., one or more times). Further, example vehicles disclosed herein deactivate one or more vehicle functions (e.g., an alert) that is otherwise initiated via a signal from the key fob when remote park-assist has been initiated via the key fob.

As used herein, a "key fob" refers to a dedicated electronic remote device that wirelessly communicates with a vehicle to unlock and/or lock vehicle door(s), unlatch the vehicle door(s), open and/or close the vehicle door(s), activate an engine of the vehicle, and/or control other function(s) of the vehicle. As used herein, a "mobile device" refers to an electronic remote device that is configured to (1) wirelessly communicate with a vehicle to control vehicle function(s) and (2) wirelessly communicate with other device(s) to control non-vehicle-related functions. Example mobile devices include a smart phone, a wearable, a smart watch, a tablet, etc.

As used herein, "vehicle park-assist" and "park-assist" refer to a system in which a vehicle controls its motive functions, without direct steering or velocity input from an operator (e.g., a driver), to autonomously park within a parking spot. For example, an autonomy unit of a park-assist system controls the motive functions of the vehicle upon receiving an initiation signal from the operator. As used herein, "remote parking," "vehicle remote park-assist," "remote park-assist," and "RePA" refer to a system in which a vehicle controls its motive functions, without direct steering or velocity input from an operator (e.g., a driver), to autonomously park within a parking spot while the operator is located outside of the vehicle. For example, an autonomy unit of a remote park-assist system controls the motive functions of the vehicle upon receiving a remote initiation signal from a mobile device of the operator.

As used herein, "remote entry," "remote keyless entry," and "RKE" refer to a vehicle system that unlocks and/or opens one or more doors of a vehicle in response to receiving a signal to do so from an authorized remote device (e.g., a key fob, a mobile device). As used herein, "remote start" refers to a vehicle system that starts or activates an engine of a vehicle in response to receiving a signal to do so from an authorized remote device (e.g., a key fob, a mobile device).

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be semi-autonomous (e.g., some routine motive functions controlled by the vehicle 100) and/or autonomous (e.g., motive functions are controlled by the vehicle 100 without direct driver input).

In the illustrated example, the vehicle 100 includes one or more low frequency (LF) modules 102 and a receiver-transceiver module 104. Each of the LF modules 102 and the receiver-transceiver module 104 includes hardware (e.g., processors, memory, storage, antenna, etc.) and software to control wireless network interfaces. For example, the LF modules 102 include hardware and software to communicate via LF signals (e.g., 125 kHz to 134.5 kHz, etc.), and the receiver-transceiver module 104 include hardware and software to communicate via ultra-high frequency (UHF) signals and/or other medium-frequency signals (e.g., 314 MHz to 904 MHz, etc.). As disclosed in greater detail below with respect to FIG. 2, the LF modules 102 and the receiver-transceiver module 104 are configured to wirelessly communicate with a key fob 106 of a user 108 to determine a distance between the key fob 106 and the vehicle 100.

Further, in the illustrated example, the vehicle 100 of the illustrated example includes a communication module 110 and antenna modules 112 that are configured for wireless communication with the key fob 106 of the user 108. For example, the key fob 106 and/or a mobile device (a smart phone, a wearable, a smart watch, a tablet, etc.) is configured to communicate with the communication module 110 and antenna modules 112 to initiate vehicle functions, such as passive entry, passive start, remote entry, remote start, remote park-assist, etc. Further, in some examples, the communication module 110 and the antenna modules 112 are configured to localize the key fob 106 for initiation of one or more of the vehicle function(s).

The antenna modules 112 include hardware (e.g., processors, memory, storage, antenna, etc.) and software to control wireless network interface(s). For example, the antenna modules 112 are configured for personal or local area wireless network protocols (e.g., Bluetooth®, Bluetooth® Low Energy (BLE), Zigbee®, Z-Wave®, etc.). In some examples, the antenna modules 112 may be referred to as "BLE Antenna Modules (BLEAMs)" when the antenna modules 112 are configured to implement BLE communication. In some examples, the antenna modules 112 communicatively couple to a remote device (e.g., the key fob 106, a mobile device) and measure and/or receive measurements of the signal strength of the signals (e.g., received signal strength indicators) broadcast by the remote device to facilitate determining a distance to and/or a location of the remote device relative to the vehicle 100. Further, in some examples, one or more of the antenna modules 112 are located inside a cabin of the vehicle 100 to determine when a remote device is within the cabin and/or to localize the remote device within the cabin (e.g., to enable passive start of the vehicle 100). In some examples, the distance between the key fob 106 and the vehicle 100 may be determined utilizing time-of-flight technology to measure a roundtrip time of communication (e.g., BLE, Wi-Fi, Ultra-wideband (UWB), etc.) between the key fob 106 and the communication module 110.

The communication module 110 is communicatively coupled to the antenna modules 112. For example, the communication module 110 is communicatively coupled to the antenna modules 112 to track a distance to and/or a location of a remote device (e.g., the key fob 106, a mobile device) relative to the vehicle 100. The communication module 110 may be referred to as a "BLE Module (BLEM)" when the antenna modules 112 are configured to implement BLE communication. In some examples, the communication module 110 is configured to receive and analyze the signal strength measurements (e.g., received signal strength indicators) between the antenna modules 112 and a remote device. Based on these measurements, the communication module 110 determines a location of the remote device relative to the vehicle 100 to facilitate initiation of one or more vehicle functions. For example, a passive entry function is initiated upon the communication module 110 determining that the remote device is near a vehicle door and/or a passive start function is initiated upon the communication module 110 determining that the remote device is within the cabin of the vehicle 100.

The vehicle 100 of the illustrated example also includes an autonomy unit 114. The autonomy unit 114 is an electronic control unit that is configured to perform autonomous and/or semi-autonomous motive functions for the vehicle 100. For example, the autonomy unit 114 is configured to control performance of autonomous and/or semi-autonomous driving maneuvers of the vehicle 100 based upon, at least in part, data collected by range-detection sensors of the vehicle 100 (e.g., range-detection sensors 618 of FIG. 6). In the illustrated example, the autonomy unit 114 controls performance of autonomous and/or semi-autonomous driving maneuvers for remote park-assist of the vehicle 100.

In the illustrated example, the vehicle 100 also includes a command controller 116. For example, the command controller 116 is configured to identify and process signals collected from the key fob 106 and/or a mobile device of the user 108 by communication module(s) of the vehicle 100 (e.g., the LF modules 102, the receiver-transceiver module 104, the communication module 110, the antenna modules 112, etc.).

In operation, the key fob 106 is utilized to initiate remote park-assist and/or other vehicle functions of the vehicle 100. For example, the vehicle 100 of the illustrated example is permitted to autonomously perform motive functions for remote park-assist when the user 108 is within a tethering range 118 of the vehicle 100 and is prohibited from autonomously performing the motive functions when the user 108 is outside of the tethering range 118. For instance, some governmental agencies have instituted regulations that require the user 108 be within the tethering range 118 of the vehicle 100 while the vehicle 100 is autonomously performing remote park-assist motive functions. The tethering range 118 of the illustrated example is defined to extend to a predetermined distance (e.g., 6 meters) from an exterior surface of the vehicle 100. The user 108 is within the tethering range 118 of the vehicle 100 if a distance between the user 108 and the exterior surface of the vehicle 100 is less than or equal to the predetermined distance of the tethering range 118.

As used herein, to "tether" refers to authenticating a key fob and/or mobile device and its distance to a vehicle to initiate remote parking for the vehicle. For example, a vehicle is configured to perform remote parking upon receiving instruction(s) to do so from a key fob and/or mobile device that is tethered to the vehicle and is configured to not perform remote parking upon receiving instruction(s) from a key fob and/or mobile device that is untethered from the vehicle. As used herein, a "tethered" device refers to a key fob and/or a mobile device that is enabled to send instructions to a vehicle to perform remote parking. For example, a key fob and/or mobile device is tethered to a vehicle responsive to the key fob and/or mobile device being wirelessly communicatively coupled to the vehicle and located within a predetermined tethering range (e.g., 6 meters) of the vehicle. In such examples, a key fob and/or mobile device that sends instructions to a vehicle to perform remote parking is untethered from the vehicle if the key fob and/or mobile device is beyond the tethering range of the vehicle.

In some examples, a remote park-assist system utilizes both the key fob 106 and a mobile device (a smart phone, a wearable, a smart watch, a tablet, etc.) carried by the user 108 to initiate remote park-assist for the vehicle 100. For example, the command controller 116 utilizes communication with the key fob 106 to determine the distance between the user 108 and the vehicle and utilizes communication with the mobile device for receiving remote park-assist signals from the user 108. The command controller 116 utilizes communication between the key fob 106 and the LF modules 102 and/or the receiver-transceiver module 104 to determine the distance between the vehicle 100 and the key fob 106. For example, the command controller 116 determines the distance between the user 108 and the vehicle 100 based upon low-frequency communication between the key fob 106 and the LF modules 102 rather than the wireless communication with the mobile device, because calculating a distance based upon a received signal strength indicator (RSSI) of low-frequency communication is more accurate than calculating a distance based upon an RSSI of BLE, Wi-Fi, ultra-wideband (UWB), and/or communication signals with similar sample rates. That is, because the key fob 106 has an LF antenna (e.g., an LF antenna 508 of FIG. 5) for low-frequency communication, the command controller 116 utilizes the RSSI of communication with the key fob 106 to approximate a distance between the user 108 and the vehicle 100. Communication between the key fob 106 and the vehicle 100 that is utilized for determining the distance between the two is disclosed below in further detail with respect to FIG. 2.

Further, in such examples, the command controller 116 utilizes communication between the mobile device and the antenna modules 112 and/or the receiver-transceiver module 104 to receive signals for initiating RePA from the user 108. Because the mobile device has antenna(s) for BLE, Wi-Fi, UWB, and/or other communication protocol(s), the command controller 116 utilizes the antenna modules 112 and/or the receiver-transceiver module 104 to receive RePA signal(s) from the mobile device via BLE, Wi-Fi, UWB, and/or other communication protocol(s). By utilizing (1) communication with the key fob 106 to determine a distance to the user 108 and (2) communication with the mobile device to receive signals for initiating RePA functions, the command controller 116 is able to simultaneously determine the distance to the user 108 and receiving RePA signals.

Additionally, or alternatively, the key fob 106 of the illustrated example is configured to be utilized for both (1) determining the distance to the user 108 and (2) sending signals to initiate RePA functions. For example, the key fob 106 is configured to send signals to the vehicle 100 to initiate RePA functions upon communicating with the vehicle 100 to determine the distance between the key fob 106 and the vehicle 100. In some examples, the remote park-assist system of the vehicle 100 utilizes the key fob 106 to send RePA signals if the mobile device has been misplaced by the user 108 and/or has a discharged battery. That is, the key fob 106 of the illustrated example is configured to be utilized as a backup remote device for initiating performance of RePA for the vehicle 100. Additionally, or alternatively, the remote park-assist system of the vehicle 100 may utilize the key fob 106 to send RePA signals if the user 108 prefers carrying only a single remote device for initiating performance of RePA for the vehicle 100.

Figure 2:
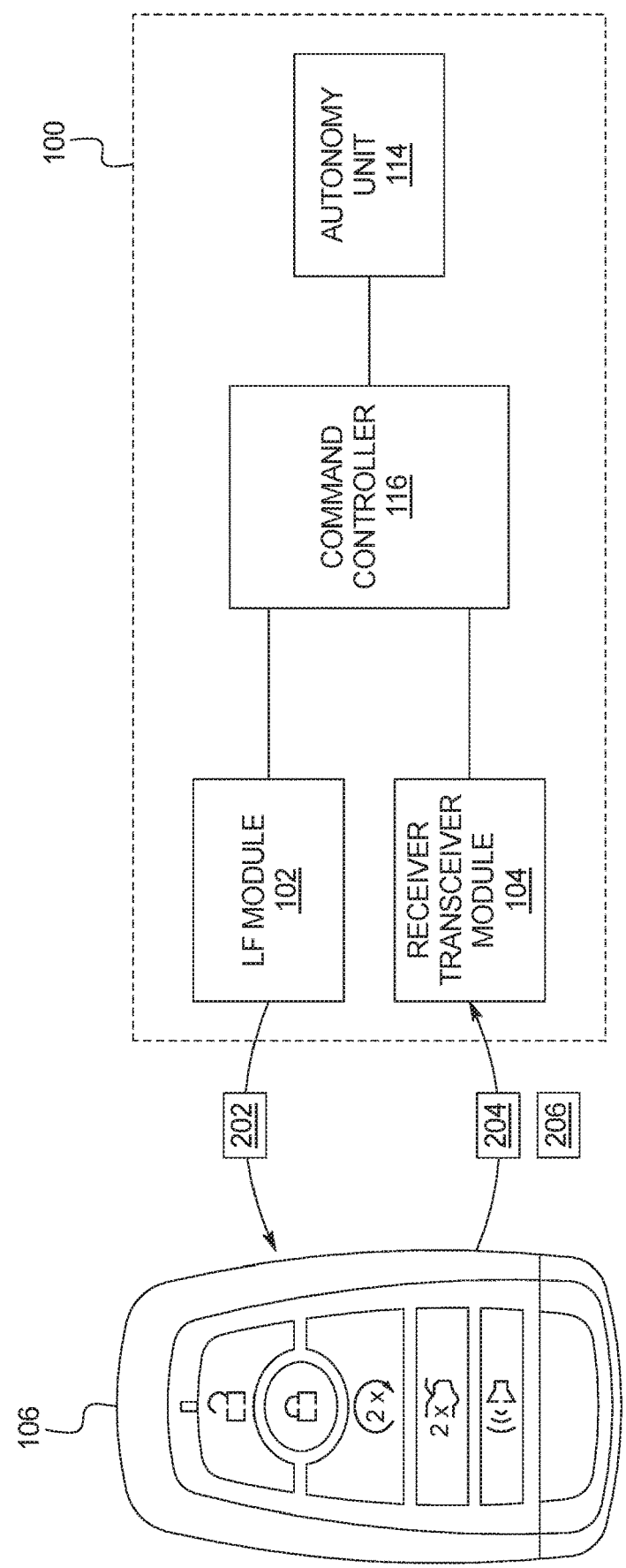
FIG. 2 depicts a schematic of communication between the key fob and the vehicle of FIG. 1.

FIG. 2 depicts a schematic of communication between the key fob 106 and the vehicle 100. In the illustrated example, the communication between the key fob 106 and the vehicle 100 is asymmetrical. That is, one or more of the LF modules 102 sends signals to the key fob 106, and the receiver-transceiver module 104 receives signals from the key fob 106.

For example, the one or more of the LF modules 102 transmits a beacon 202 (e.g., to be received by the key fob 106) in the form of a LF signal. Further, the receiver-transceiver module 104 receives a return signal 204 from the key fob, for example, in the form of a UHF signal. Upon receiving the beacon 202 from one or more of the LF modules 102, the key fob 106 (e.g., via a processor 502 of FIG. 5) determines a distance indicator (a received signal strength indicator or RSSI) for the received beacon. Further, the key fob (e.g., via the processor 502) includes the distance indicator in the return signal 204. Subsequently, the receiver-transceiver module 104 receives the return signal from the key fob 106, for example, in the form of a UHF signal and determines the distance between the vehicle 100 and the key fob 106 based on the distance identifier within the return signal. Further, in some examples, the return signal 204 includes an authentication token (e.g., an encrypted identifier, an encrypted counter, etc.) to enable the command controller 116 to determine whether the key fob 106 is authorized for communication with the vehicle 100. In some examples, the vehicle 100 may use the same wireless protocol (e.g., BLE, WiFi, UWB, etc.) for both sending the beacon 202 to the key fob 106 and receiving the return signal 204 from the key fob 106. In such examples, the beacon 202 and the return signal 204 may communicate RSSI or time-of-flight information that is utilized for determining the distance between key fob 106 and the vehicle 100.

Additionally, the key fob 106 is configured to send a command signal 206 to the receiver-transceiver module 104 of the vehicle 100 upon the user 108 pressing a button, a predefined sequence and/or combination of button(s) of the key fob 106. For example, the command signal 206 includes an unlock signal, a lock signal, a remote start signal, a RePA signal, etc. Further, the command controller 116 collects the command signal 206 to identify a corresponding vehicle function. For example, if the command signal 206 includes a RePA signal, the command controller 116 causes the autonomy unit 114 to perform motive function(s) for RePA based on the command signal 206.

Figure 3:
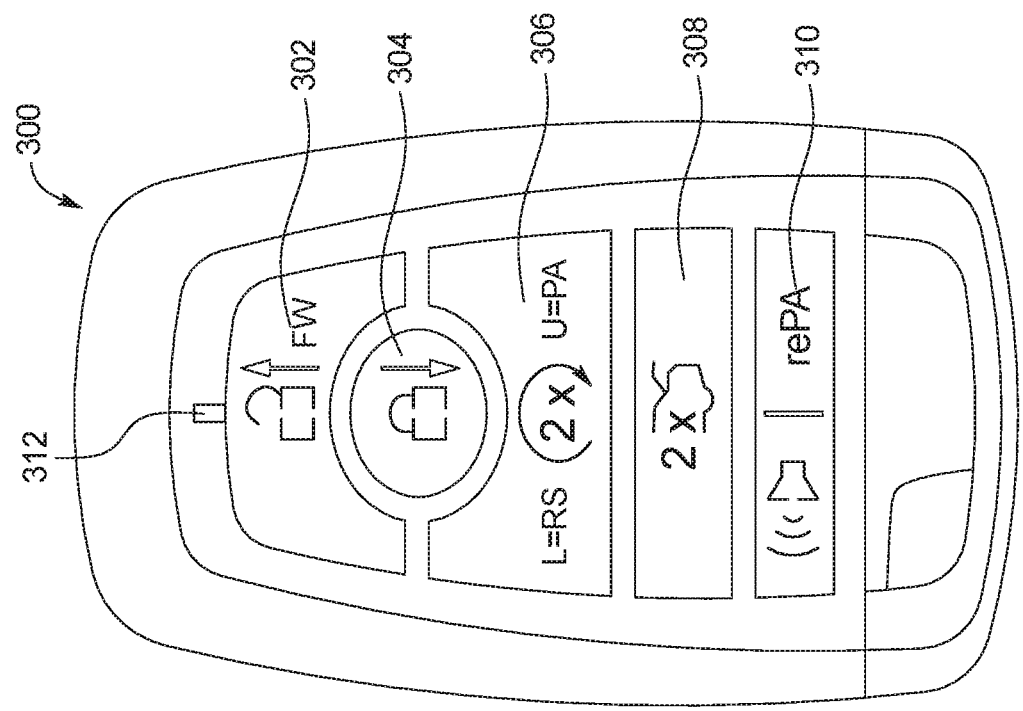
FIG. 3 depicts an example of the key fob of FIG. 1.

FIG. 3 depicts an example key fob 300 in accordance with the teachings herein. That is, the key fob 300 is an example of the key fob 106 of FIGS. 1 and 2. As illustrated in FIG. 3, the key fob 300 includes a plurality of buttons (e.g., buttons 506 of FIG. 5). For example, the key fob 300 includes an unlock button 302 and a lock button 304.

Figure 6:
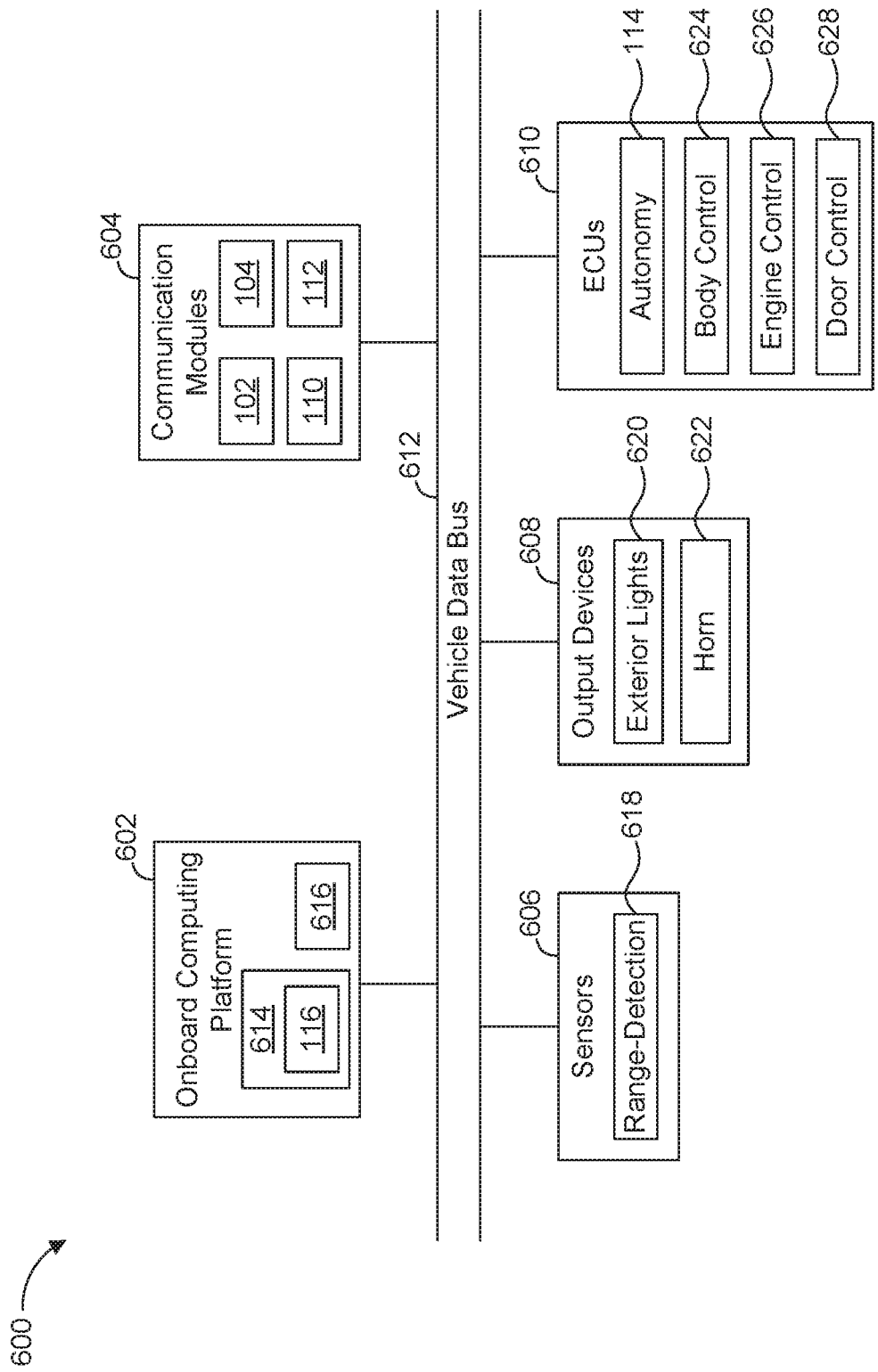
FIG. 6 is a block diagram of electronic components of the vehicle of FIG. 1.

When the unlock button 302 is pressed by the user 108, the key fob 106 is configured to send an unlock signal to the vehicle 100 to unlock one or more locked doors of the vehicle 100 (e.g., via door control units 628 of FIG. 6). For example, when the unlock button 302 is pressed once, the key fob 106 is configured to send a first unlock signal to the vehicle 100 to unlock the driver's door of the vehicle 100. In some examples, when the unlock button 302 is pressed twice within a predetermined period of time (e.g., 3 seconds), the key fob 106 is configured to send a second unlock signal to the vehicle 100 to unlock all of the doors of the vehicle 100. Further, in some examples, when the unlock button 302 is held for a predetermined period of time (e.g., 4 seconds), the key fob 106 is configured to send an open signal to the vehicle 100 to open one or more windows of the vehicle 100 (e.g., via the door control units 628).

When the lock button 304 is pressed by the user 108, the key fob 106 is configured to send an lock signal to the vehicle 100 to lock unlocked door(s) of the vehicle 100 (e.g., via the door control units 628). For example, when the lock button 304 is pressed once, the key fob 106 is configured to send a lock signal to the vehicle 100 to lock the doors of the vehicle 100. In some examples, when the lock button 304 is pressed twice within a predetermined period of time (e.g., 3 seconds), the key fob 106 is configured to send a signal to the vehicle 100 that instructs the command controller 116 to cause (e.g., via a body control module 624 of FIG. 6) a speaker and/or horn of the vehicle 100 to emit a chirp alert. Further, in some examples, the command controller 116 causes lights to flash upon each pressing of the lock button 304 and/or the doors locking. Additionally, or alternatively, when the lock button 304 is held for a predetermined period of time (e.g., 4 seconds), the key fob 106 is configured to send a close signal to the vehicle 100 to close one or more windows of the vehicle 100 (e.g., via the door control units 628).

The key fob 300 of the illustrated example also includes a trigger button 306 (sometimes referred to as a "2×" button). The trigger button 306, in combination with the other buttons of the key fob 300, is configured to trigger other vehicle functions of the vehicle 100. For example, when the lock button 304 is pressed once and the trigger button 306 is subsequently pressed twice in succession within a predetermined period of time (e.g., 3 seconds), the key fob 106 is configured to send a remote-start signal to the vehicle 100 to remote start an engine of the vehicle 100 (e.g., via an engine control unit 626 of FIG. 6). Further, in some examples when remote-start is active, the key fob 106 is configured to send a remote-start stop signal when the trigger button 306 is pressed only once within a predetermined period of time. Additionally, or alternatively, when the unlock button 302 is pressed once and the trigger button 306 is subsequently pressed twice in succession, the key fob 106 is configured to send a RePA signal to the vehicle 100 to initiate RePA for the vehicle 100 (e.g., via the autonomy unit 114).

In the illustrated example, the key fob 300 also includes a hatch button 308, an alert button 310 (sometimes referred to as a panic button), and a lamp 312 (e.g., a light emitting diode or LED). The hatch button 308 (sometimes referred to as a trunk button or a liftgate button) is configured to initiate opening and/or closing a hatch, a liftgate, a deck lid, a frunk, and/or trunk of the vehicle 100. For example, when the hatch button 308 is pressed twice within a predetermined period of time (e.g., 3 seconds), the key fob 106 is configured to send a hatch signal to actuate the hatch of the vehicle 100. When the hatch is closed, the vehicle 100 (e.g., via one of the door control units 628) is to open the hatch upon receiving the hatch signal. Further, in some examples when the hatch is open, the vehicle 100 (e.g., via one of the door control units 628) is to close the hatch upon receiving the hatch signal. The alert button 310 (sometimes referred to as a panic button) is configured to initiate an alert (e.g., an audio and/or visual alert) of the vehicle 100 if pushed while the vehicle 100 is off and/or in a non-motive state (e.g., when the vehicle 100 is in a remote start mode with the engine active). For example, when the alert button 310 is pressed by the user 108, the key fob 106 is configured to send alert signal to the vehicle 100 to emit the alert. Further, the lamp 312 is configured to emit alert(s) to the user 108 regarding the status of vehicle function(s) initiated via the key fob 106. For example, the lamp 312 emits different colors (e.g., red, green) and/or a different sequences (e.g., different combinations of dots and dashes) to emit different alerts to the user 108. In some examples, to warn the user 108 that the alert button 310 is stuck while RePA is initiated, the lamp 312 is configured to (1) emit a red light when only the alert button 310 is engaged and (2) emit a green light when the alert button and the unlock button 302 and/or the lock button 304 are engaged.

In the illustrated example, each button of the key fob 300 includes a label for both park-assist functionality and non-park-assist functionality. In other examples, one or more buttons of the key fob 300 includes a label only for park-assist functionality or non-park-assist functionality.

Figure 4:
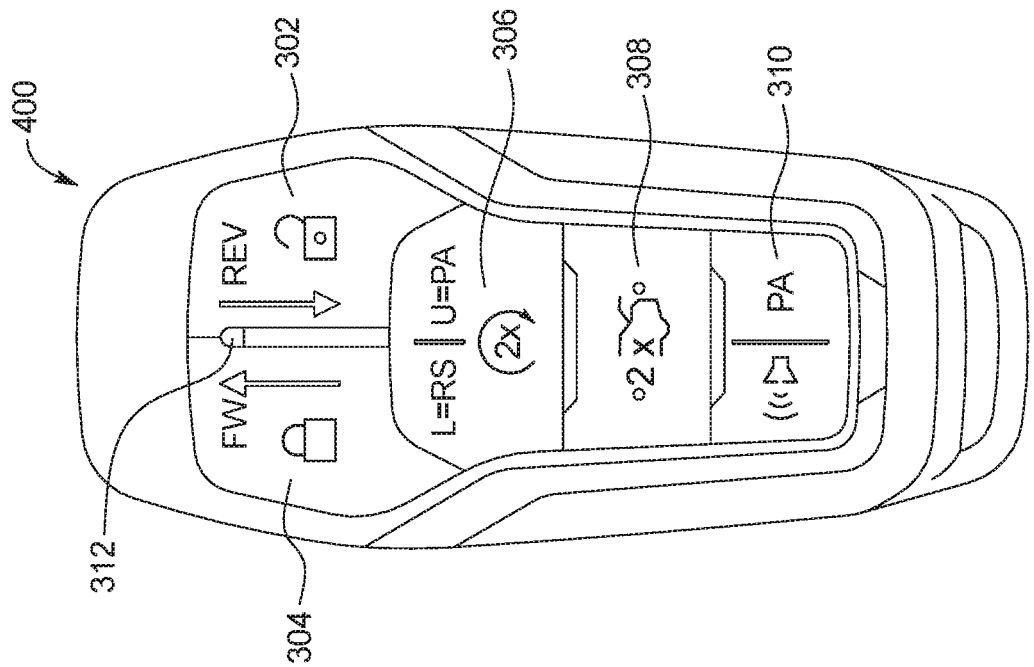
FIG. 4 depicts another example of the key fob of FIG. 1.

FIG. 4 depicts another example key fob 400 in accordance with the teachings herein. That is, the key fob 400 is an example of the key fob 106 of FIGS. 1 and 2. The key fob 400 includes the unlock button 302, the lock button 304, the trigger button 306, the hatch button 308, the alert button 310, and the lamp 312. As illustrated in FIGS. 3 and 4, the unlock button 302, the lock button 304, the trigger button 306, the hatch button 308, the alert button 310, and the lamp 312 are arranged differently on the key fob 400 relative to the key fob 300. In the illustrated example, each button of the key fob 400 includes a label for both park-assist functionality and non-park-assist functionality. In other examples, one or more buttons of the key fob 300 includes a label only for park-assist functionality or non-park-assist functionality.

In operation, a controller (e.g., the processor 502) of the key fob 106 (e.g., the key fob 300, the key fob 400) is configured to transmit, via an antenna (e.g., via a UHF antenna 510 and/or a BLE antenna 512), a signal to the vehicle 100 (e.g., to the receiver-transceiver module 104 and/or the antenna modules 112) based on one or more buttons of the key fob 106 that the user 108 has pressed. For example, the controller of the key fob 106 is configured to transmit, via a medium-frequency antenna (e.g., a UHF antenna 510 of FIG. 5), a low-energy antenna (e.g., a BLE antenna 512 of FIG. 6), and/or any other antenna a signal to the receiver-transceiver module 104 and/or the antenna modules 112 of the vehicle 100 based on the button(s) that the user 108 has pressed.

For example, the controller of the key fob 106 is configured to transmit, via an antenna, an unlock signal to the vehicle 100 responsive to detecting that the unlock button 302 has been pressed. The command controller 116 is configured to cause (e.g., via the door control units 628) one or more doors of the vehicle 100 to be unlocked in response to receiving the unlock signal. Further, the controller of the key fob 106 is configured to transmit, via an antenna, a lock signal to the vehicle 100 responsive to detecting that the lock button 304 has been pressed. The command controller 116 is configured to cause (e.g., via the door control units 628) one or more doors of the vehicle 100 to be locked in response to receiving the lock signal. Further, the controller of the key fob 106 is configured to transmit, via an antenna, an alert signal to the vehicle 100 responsive to detecting that the unlock button 302 has been pressed. The command controller 116 is configured to cause a horn (e.g., a horn 622 of FIG. 6), lamps (e.g., exterior lamps 620 of FIG. 6), and/or other output device(s) of the vehicle 100 to emit an alert in response to receiving the alert signal. Further, the controller of the key fob 106 is configured to transmit, via an antenna, a remote-start signal to the vehicle 100 responsive to detecting that a remote-start combination of fob buttons (e.g., the buttons 506) has been pressed. For example, the remote-start combination of fob buttons includes a sequence of pressing the lock button 304 and subsequently pressing the trigger button 306 a predefined number of times (e.g., twice). The command controller 116 is configured to cause (e.g., via the engine control unit 626) an engine of the vehicle 100 to be started remotely in response to receiving the remote-start signal.

The controller of the key fob 106 also is configured to transmit, via an antenna, a RePA signal to initiate RePA for the vehicle 100 responsive to detecting that a RePA combination of the fob buttons has been pressed. For example, the RePA combination of fob buttons includes a sequence of pressing the unlock button 302 and subsequently pressing the trigger button 306 a predefined number of times (e.g., twice). The command controller 116 is configured to cause the autonomy unit 114 to initiate RePA in response to receiving the RePA signal.

In some examples, the command controller 116 associates a same signal sent from the key fob 106 differently based on whether RePA of the vehicle 100 is initiated. Memory of the key fob 106 (e.g., memory 504 of FIG. 5) is configured to store a predefined number of action codes corresponding to different combinations of the fob buttons. For example, one action code is associated with the lock signal, another action code may be associated with the unlock signal, etc. In some examples, the number of vehicles functions to be initiated by the key fob 106 exceeds the predefined number of action codes. To enable the key fob 106 to initiate a greater number of vehicle functions, the command controller 116 designates signals for different vehicle functions based on whether RePA is initiated. For example, if RePA is not initiated, the command controller 116 is configured to initiate a first vehicle function upon receiving a first signal from the key fob 106. In contrast, if RePA is initiated, the command controller 116 is configured to initiate a second vehicle function upon receiving the first signal from the key fob 106. Additionally, or alternatively, the command controller 116 is configured to temporarily disable one or more vehicle functions based on whether RePA of the vehicle 100 is initiated. For example, the command controller 116 is configured to prevent output device(s) of the vehicle 100 (e.g., the exterior lamps 620, the horn 622) upon receiving the alert signal while RePA is initiated.

While RePA is initiated for the vehicle 100, the controller of the key fob 106 is configured to transmit, via an antenna, a forward signal to instruct the autonomy unit 114 of the vehicle 100 preform a forward motion for RePA responsive to detecting that a forward combination of the fob buttons has been pressed. For example, the forward combination of fob buttons includes simultaneously holding (i) the unlock button 302 and (ii) the alert button 310 and/or an undesignated button. The command controller 116 is configured to cause the autonomy unit 114 to perform a forward motion for RePA in response to receiving the forward signal via the receiver-transceiver module 104 and/or the antenna modules 112 of the vehicle 100. Further, the key fob 106 is configured to stop transmitting, via the antenna, the forward signal in response to a forward combination of the fob buttons having stopped being pressed. The autonomy unit 114 is configured to stop motive functions of the vehicle 100 in response to the receiver-transceiver module 104 and/or the antenna modules 112 having stopped receiving the forward signal. Further, in some examples, the autonomy unit 114 adjusts how the vehicle 100 is stopped based on which of the fob buttons was released first. For example, if the unlock button 302 is released before the alert button 310 and/or undesignated button, the key fob 106 is configured to transmit a quick-stop signal and the autonomy unit 114 is configured to quickly decelerate the vehicle 100 to a stop upon receipt of the signal. If the alert button 310 and/or undesignated button is released before the unlock button 302, the key fob 106 is configured to transmit a slow-stop signal and the autonomy unit 114 is configured to gradually decelerate the vehicle 100 to a stop upon receipt of the signal.

Additionally, while RePA is initiated for the vehicle 100, the controller of the key fob 106 is configured to transmit, via an antenna, a reverse signal to instruct the autonomy unit 114 of the vehicle 100 preform a reverse motion for RePA responsive to detecting that a reverse combination of the fob buttons has been pressed. For example, the reverse combination of fob buttons includes simultaneously holding (i) the lock button 304 and (ii) the alert button 310 and/or an undesignated button. The command controller 116 is configured to cause the autonomy unit 114 to perform a reverse motion for RePA in response to receiving the reverse signal via the receiver-transceiver module 104 and/or the antenna modules 112. Further, the key fob 106 is configured to stop transmitting, via the antenna, the reverse signal in response to the reverse combination of the fob buttons having stopped being pressed. The autonomy unit 114 is configured to stop motive functions of the vehicle 100 in response to the receiver-transceiver module 104 and/or the antenna modules 112 having stopped receiving the reverse signal. Further, in some examples, the autonomy unit 114 adjusts how the vehicle 100 is stopped based on which of the fob buttons was released first. For example, if the lock button 304 is released before the alert button 310 and/or undesignated button, the key fob 106 is configured to transmit a quick-stop signal and the autonomy unit 114 is configured to quickly decelerate the vehicle 100. If the alert button 310 and/or undesignated button is released before the lock button 304, the key fob 106 is configured to transmit a slow-stop signal and the autonomy unit 114 is configured to gradually decelerate the vehicle 100.

Further, while RePA is initiated for the vehicle 100, the controller of the key fob 106 is configured to transmit, via an antenna, an exit signal to instruct the vehicle 100 to deactivate RePA responsive to detecting that an exit combination of the fob buttons has been pressed. For example, the exit combination of fob buttons includes pressing the trigger button 306, the hatch button 308, or the alert button 310 a predefined number of times (e.g., twice) upon previously releasing all of the fob buttons. The command controller 116 is configured to cause the autonomy unit 114 to stop performing RePA in response to receiving the exit signal via the receiver-transceiver module 104 and/or the antenna modules 112 of the vehicle 100. Further, in the illustrated example of FIG. 4, the lock button 304 corresponds with a forward RePA motion and the unlock button 302 corresponds with a reverse RePA motion. Additionally, or alternatively, one or more of the buttons may correspond with different RePA function(s) other than those shown in FIG. 3 and/or FIG. 4.

Figure 5:
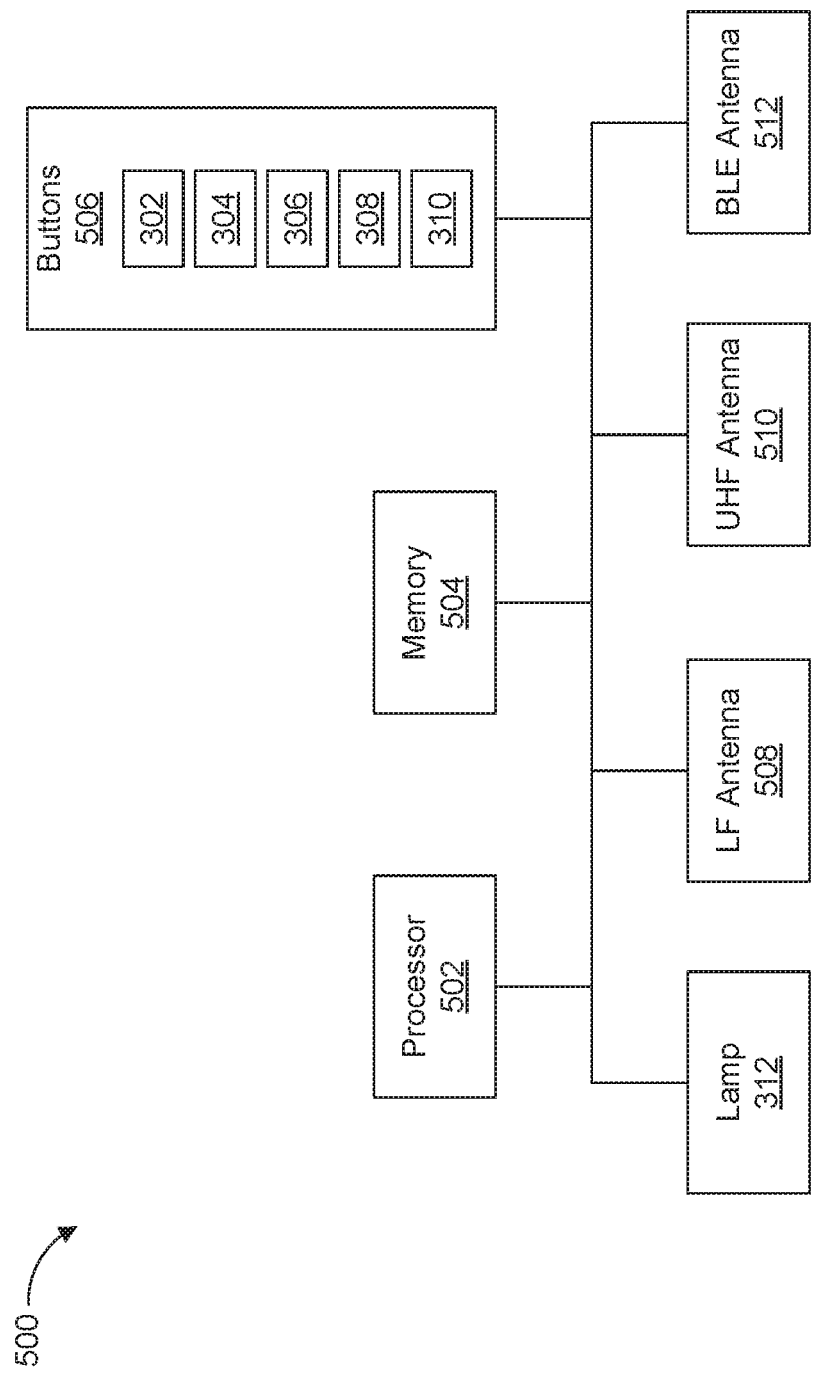
FIG. 5 is a block diagram of electronic components of the key fob of FIG. 1.

FIG. 5 is a block diagram of electronic components 500 of the key fob 106 (e.g., the key fob 300, the key fob 400). In the illustrated example, the electronic components 500 include a processor 502, memory 504, buttons 506, the lamp 312, an LF antenna 508, and a UHF antenna 510.

In the illustrated example, the processor 502 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 504 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 504 includes multiple kinds of memory, particularly volatile memory and non-volatile memory.

The memory 504 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 504, the computer readable medium, and/or within the processor 502 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The buttons 506 of the illustrated example are input devices that are configured to receive input information from the user 108 of the vehicle 100. For example, one or more of the buttons 506 are configured to receive requests for remote entry, remote start, unlocking and/or locking a door, opening and/or closing a hatch and/or trunk, emitting an alert, opening and/or closing a door window, remote park-assist, etc. In the illustrated example, the buttons 506 include the unlock button 302, the lock button 304, the trigger button 306, the hatch button 308, and the alert button 310. Further, the lamp 312 (e.g., an LED) of the illustrated example is an output device that is configured to provide output information to the user 108 of the vehicle 100. For example, the lamp 312 is configured to provide output information regarding remote entry, remote start, unlocking and/or locking a door, opening and/or closing a hatch and/or trunk, emitting an alert, opening and/or closing a door window, remote park-assist, etc.

The LF antenna 508 of the illustrated example includes hardware (e.g., processors, memory, storage, antenna, etc.) and software to communicate via LF signals (e.g., 125 kHz to 134.5 kHz, etc.). For example, the LF antenna 508 is configured to receive a beacon message that is transmitted by one or more of the LF modules 102 of the vehicle 100. Further, the processor 502 is configured to identify a distance that the beacon message has travelled based on characteristics of the beacon message.

The UHF antenna 510 of the illustrated example is configured to include hardware and software to communicate via ultra-high frequency (UHF) signals (e.g., 314 MHz to 904 MHz, etc.) and/or other medium-frequency signals. For example, the UHF antenna 510 is configured to transmit a return signal to the receiver-transceiver module 104 of the vehicle 100. In some examples, the processor 502 includes a corresponding distance indicator (e.g., a received signal strength indicator) in the return signal to enable the receiver-transceiver module 104 to identify the distance between the vehicle 100 and the key fob 106. Further, the UHF antenna 510 is configured to transmit an unlock signal, a lock signal, a remote start signal, a RePA signal, and/or any other signal that corresponds with a predefined combination of the buttons 506 (e.g., the buttons 302, 304, 306, 308, 310) pressed by the user 108.

Further, in some examples, the electronic components 500 of the key fob 106 also include a BLE antenna 512 to enable the key fob 106 to communicate with the vehicle 100 via BLE communication. For example, the BLE antenna 512 includes hardware and software to communicate via BLE signals. In such examples, the BLE antenna 512 is configured to transmit an unlock signal, a lock signal, a remote start signal, a RePA signal, and/or any other signal that corresponds with a predefined combination of fob button(s) (e.g., the buttons 302, 304, 306, 308, 310) pressed by the user 108. Further, in some examples, UWB or Wi-Fi communication and time-of-flight methodologies are utilized in lieu of or in addition to BLE communication for estimating a distance between the key fob 106 and the vehicle 100. Additionally, or alternatively, BLE communication and time-of-flight methodologies (e.g., instead of received signal strength indicators) are implemented by the key fob 106 and the vehicle 100 to determine the distance between the two.

FIG. 6 is a block diagram of electronic components 600 of the vehicle 100. In the illustrated example, the electronic components 600 include an onboard computing platform 602, communication modules 604, sensors 606, output devices 608, electronic control units (ECUs) 610, and a vehicle data bus 612.

The onboard computing platform 602 includes a processor 614 (also referred to as a microcontroller unit and a controller) and memory 616. In the illustrated example, the processor 614 of the onboard computing platform 602 is structured to include the command controller 116. In other examples, the command controller 116 is incorporated into another ECU with its own processor and memory. The processor 614 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 616 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 616 includes multiple kinds of memory, particularly volatile memory and non-volatile memory.

The memory 616 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 616, the computer readable medium, and/or within the processor 614 during execution of the instructions.

The communication modules 604 are configured to wirelessly communicate with the key fob 106 and/or another device. In the illustrated example, the communication modules 604 include the LF modules 102 that are configured for LF communication, the receiver-transceiver module 104 that is configured for UHF and/or other medium-frequency communication, and the communication module 110 and the antenna modules 112 that are configured for BLE communication.

The sensors 606 are arranged in and/or around the vehicle 100 to monitor properties of the vehicle 100 and/or an environment in which the vehicle 100 is located. One or more of the sensors 606 may be mounted to measure properties around an exterior of the vehicle 100. Additionally, or alternatively, one or more of the sensors 606 may be mounted inside a cabin of the vehicle 100 or in a body of the vehicle 100 (e.g., an engine compartment, wheel wells, etc.) to measure properties in an interior of the vehicle 100. For example, the sensors 606 include accelerometers, odometers, tachometers, pitch and yaw sensors, wheel speed sensors, microphones, tire pressure sensors, biometric sensors and/or sensors of any other suitable type.

In the illustrated example, the sensors 606 include range-detection sensors 618. As used herein, a "range-detection sensor" refers to an electronic device that is configured to collect information to detect a presence of and distance to nearby object(s). In the illustrated example, the range-detection sensors 618 include proximity sensors and/or cameras. The proximity sensors are configured to detect the presence, proximity, and/or location of object(s) near the vehicle 100. For example, the proximity sensors include radar sensor(s), LIDAR sensor(s), ultrasonic sensor(s), and/or any other sensor configured to detect the presence, proximity, and/or location of nearby object(s). A radar sensor detects and locates an object via radio waves, a LIDAR sensor detects and locates the object via lasers, and an ultrasonic sensor detects and locates the object via ultrasound waves. Further, the cameras are configured to capture image(s) and/or video of a surrounding area of the vehicle 100 to enable nearby object(s) to be identified and located. In the illustrated example, the range-detection sensors 618 are located along the vehicle 100 to enable the range-detection sensors 618 to monitor a surrounding area of the vehicle 100. For example, the range-detection sensors 618 monitor the surrounding area of the vehicle 100 to enable the autonomy unit 114 to perform autonomous motive functions for the vehicle 100.

The output devices 608 provide an interface for the vehicle 100 to present information to the user 108. The output devices 608 may include digital interface(s) and/or analog interface(s). In some examples, the output devices 608 include instrument cluster output(s) and/or a display. Further, in the illustrated example, the output devices 608 include exterior lamps 620 and a horn 622. For example, the exterior lamps 620 and/or the horn 622 is configured to emit an alert in response to user 108 pressing the alert button 310 of the key fob 106.

The ECUs 610 monitor and control the subsystems of the vehicle 100. For example, the ECUs 610 are discrete sets of electronics that include their own circuit(s) (e.g., integrated circuits, microprocessors, memory, storage, etc.) and firmware, sensors, actuators, and/or mounting hardware. The ECUs 610 communicate and exchange information via a vehicle data bus (e.g., the vehicle data bus 612). Additionally, the ECUs 610 may communicate properties (e.g., status of the ECUs 610, sensor readings, control state, error and diagnostic codes, etc.) to and/or receive requests from each other. For example, the vehicle 100 may have dozens of the ECUs 610 that are positioned in various locations around the vehicle 100 and are communicatively coupled by the vehicle data bus 612. In the illustrated example, the ECUs 610 include the autonomy unit 114, a body control module 624, an engine control unit 626, and one or more door control units 628.

The autonomy unit 114 controls performance of autonomous and/or semi-autonomous driving maneuvers of the vehicle 100 (e.g., for remote park-assist) based upon, at least in part, data collected by the range-detection sensors 618 of the vehicle 100. The body control module 624 controls one or more subsystems throughout the vehicle 100, such as an immobilizer system, etc. For example, the body control module 624 includes circuits that drive one or more of relays (e.g., to control wiper fluid, etc.), brushed direct current (DC) motors (e.g., to control power seats, wipers, etc.), stepper motors, LEDs, etc. Further, the engine control unit 626 controls operation of an engine (e.g., an internal combustion engine, an electric motor, a hybrid engine) of the vehicle 100. For example, the engine control unit 626 is configured to remote start the engine upon receiving a signal to do so.

The door control units 628 control one or more subsystems located on doors (e.g., a driver door, a passenger door, a hatch and/or trunk, etc.) of the vehicle 100. For example, each door of the vehicle 100 includes a respective one of the door control units 628. Each of the door control units 628 includes circuits that drive relay(s), brushed DC motor(s), stepper motor(s), LEDs, etc. for the operation of power windows, power locks, power mirrors, etc. for the respective door of the vehicle 100.

In some examples, each of door control units 628 is communicatively coupled to an electronic latch (also referred to as an e-latch) of the respective door. The e-latch is an electromechanical device that actuates a door latch to latch and/or unlatch the door. For example, the lock state is stored in memory of one or more of the door control units 628 and/or the body control module 624. Further, the e-latch is utilized for a remote entry system and/or a passive entry system of the vehicle 100. For a remote entry system, one or more of the door control units 628 instructs a respective e-latch to (1) place the latch memory in an unlock state for the respective door in response to the command controller 116 receiving an unlock signal from the key fob 106 and/or (2) lock the respective door in response to the command controller 116 receiving a lock signal from the key fob 106. For a passive entry system, one or more of the door control units 628 primes a respective e-latch of the respective door for unlocking in response to the command controller 116 detecting that the key fob 106 is located within a predetermined distance of the vehicle 100. Subsequently, the e-latch actuates a door latch to unlatch the respective door in response to detecting that a door handle of the door is being grasped by the user 108. In some examples, one of the door control units 628 corresponds with a hatch and/or trunk of the vehicle 100. That one of the door control units 628 is configured to open and/or close the hatch and/or trunk in response to the command controller 116 receiving a signal to do so from the key fob 106.

The vehicle data bus 612 communicatively couples the onboard computing platform 602, the communication modules 604, the sensors 606, the output devices 608, and the ECUs 610. In some examples, the vehicle data bus 612 includes one or more data buses. The vehicle data bus 612 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc. In some examples, the vehicle data bus 612 includes a wireless communication network (e.g., WiFi or Bluetooth).

Figure 7:
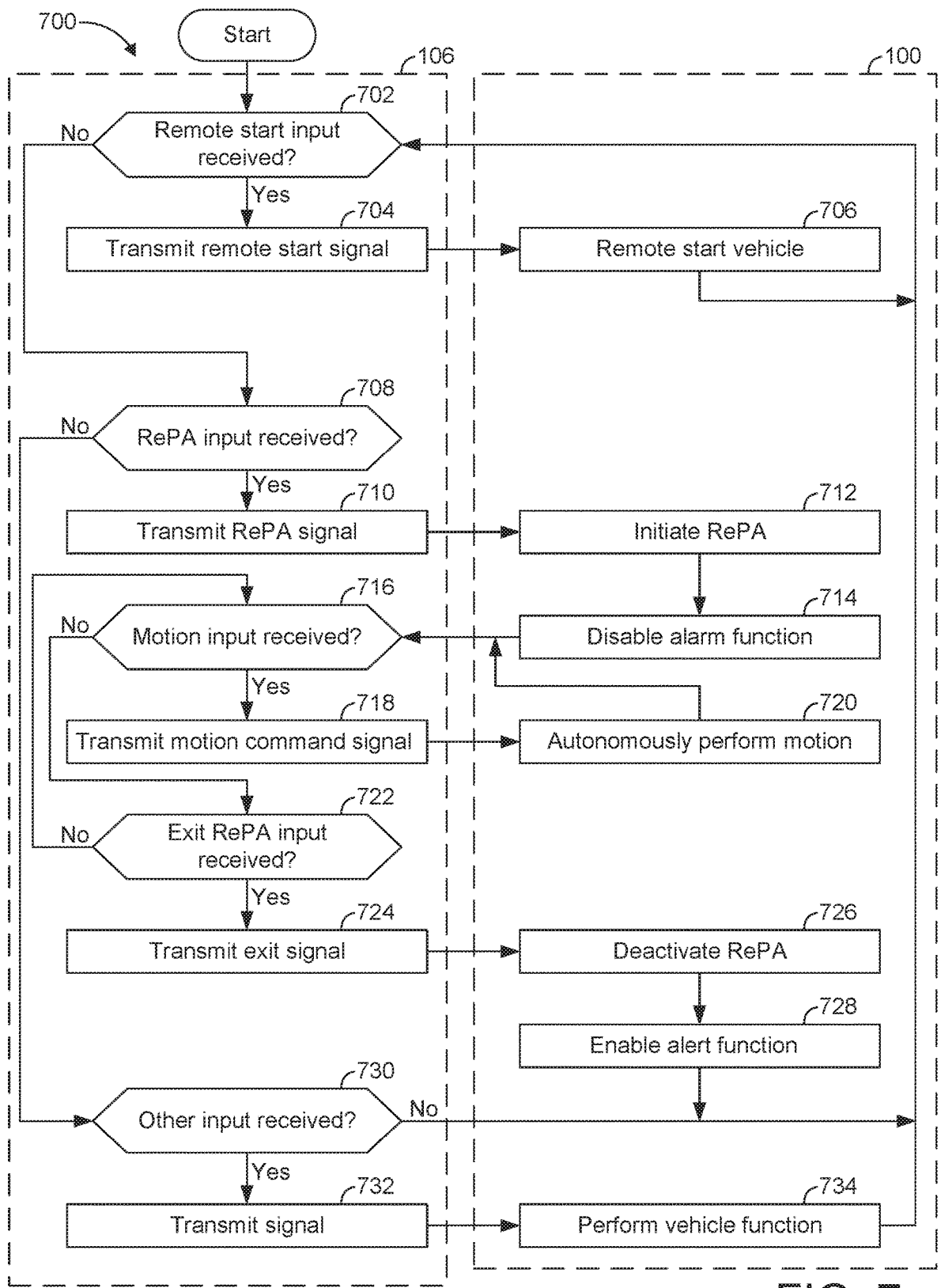
FIG. 7 is a flowchart for initiating remote park-assist and other vehicle functions via a key fob in accordance with the teachings herein.

FIG. 7 is a flowchart of an example method 700 to initiate remote park-assist and other vehicle functions via a key fob. The flowchart of FIG. 7 is representative of machine readable instructions that are stored in memory (such as the memory 504 of FIG. 5 and/or the memory 616 of FIG. 6) and include one or more programs which, when executed by a processor (such as the processor 502 and/or the processor 614 of FIG. 6), cause the key fob 106 and/or the vehicle 100 to perform the method 700. While the example program is described with reference to the flowchart illustrated in FIG. 7, many other methods for initiating remote park-assist and other vehicle functions via a key fob may alternatively be used. For example, the order of execution of the blocks may be rearranged, changed, eliminated, and/or combined to perform the method 700. Further, because the method 700 is disclosed in connection with the components of FIGS. 1-6, some functions of those components will not be described in detail below.

Initially, at block 702, the processor 502 of the key fob 106 determines whether an input for remote starting the vehicle 100 has been received. For example, the input for remote starting the vehicle 100 includes a pressing of a remote-start combination of button(s) of the key fob 106. In some examples, the remote-start combination includes a sequence of pressing the lock button 304 and subsequently pressing the trigger button 306 a predefined number of times (e.g., twice). In response to the processor 502 of the key fob 106 detecting that an input for remote starting the vehicle 100 has been received, the method 700 proceeds to block 704.

At block 704, an antenna of the key fob 106 (e.g., the UHF antenna 510, the BLE antenna 512) transmits a remote-start signal to the vehicle 100. Subsequently, a communication module of the vehicle 100 (e.g., the receiver-transceiver module 104, the antenna modules 112) receives the remote-start signal from the key fob 106. At block 706, the command controller 116 causes the engine control unit 626 to remote start an engine of the vehicle 100. Upon completing block 708, the method 700 returns to block 702.

Otherwise, returning to block 702, the method 700 proceeds to block 708 in response to the processor 502 of the key fob 106 detecting that an input for remote starting the vehicle 100 has not been received. At block 708, the processor 502 of the key fob 106 determines whether an input to initiate RePA for the vehicle 100 has been received. For example, the input for initiating RePA of the vehicle 100 includes a pressing of a RePA combination of button(s) of the key fob 106. In some examples, the RePA combination includes a sequence of pressing the unlock button 302 and subsequently pressing the trigger button 306 a predefined number of times (e.g., twice). In response to the processor 502 of the key fob 106 detecting that an input for RePA has been received, the method 700 proceeds to block 710.

At block 710, an antenna of the key fob 106 (e.g., the UHF antenna 510, the BLE antenna 512) transmits a RePA initiation signal to the vehicle 100. Subsequently, a communication module of the vehicle 100 (e.g., the receiver-transceiver module 104, the antenna modules 112) receives the RePA initiation signal from the key fob 106. At block 712, the command controller 116 causes the autonomy unit 114 to initiate RePA. Further, at block 714, the command controller 116 causes the body control module 624 to disable an alert function corresponding with the alert button 310 of the key fob 106 that may otherwise be available when RePA is not initiated for the vehicle 100.

At block 716, the processor 502 of the key fob 106 determines whether a motion command input for RePA of the vehicle 100 has been received. For example, the input for initiating a forward motion for RePA includes a pressing of a forward combination of button(s) of the key fob 106, and the input for initiating a reverse motion for RePA includes a pressing of a reverse combination of button(s) of the key fob 106. In some examples, the forward combination includes simultaneously holding (i) the alert button 310 or an undesignated button and (ii) the unlock button 302. Further, in some examples, the reverse combination includes simultaneously holding (i) the alert button 310 or an undesignated button and (ii) the lock button 304.

In response to the processor 502 of the key fob 106 detecting at block 716 that a motion command input for RePA (e.g., a forward input, a reverse input) has been received, the method 700 proceeds to block 718 at which an antenna of the key fob 106 (e.g., the UHF antenna 510, the BLE antenna 512) transmits a corresponding motion command signal to the vehicle 100. Subsequently, a communication module of the vehicle 100 (e.g., the receiver-transceiver module 104, the antenna modules 112) receives the motion command signal from the key fob 106. At block 720, the autonomy unit 114 of the vehicle 100 autonomously performs a motive function for RePA based on the motion signal. For example, if the motion command signal includes a forward signal, the autonomy unit 114 autonomously performs a forward motion for RePA. If the motion command signal includes a reverse signal, the autonomy unit 114 autonomously performs a reverse motion for RePA. Upon completing block 720, the method 700 returns to block 716.

Returning to block 716, in response to the processor 502 of the key fob 106 detecting at block 716 that a motion command input for RePA has not been received, the method 700 proceeds to block 722. At block 722, the processor 502 of the key fob 106 determines whether an input to exit RePA has been received. For example, the input for exiting RePA for the vehicle 100 includes a pressing of an exit combination of button(s) of the key fob 106. In some examples, the exit combination includes pressing the trigger button 306, the hatch button 308, or the alert button 310 a predefined number of times (e.g., twice) upon releasing all of the buttons 506 of the key fob 106. In response to the processor 502 of the key fob 106 detecting that an input to exit RePA has not been received, the method 700 returns to block 716. Otherwise, in response to the processor 502 of the key fob 106 detecting that an input to exit RePA has been received, the method 700 proceeds to block 724. In some examples, the processor 502 of the key fob 106 further determines whether to remain or exit RePA based on a predefined timer. For example, in response to the processor 502 determining that a RePA input has not been received within a predefined period of time (e.g., 15 seconds) of RePA being initiated and/or the last RePA input, the method proceeds to block 724.

At block 724, an antenna of the key fob 106 (e.g., the UHF antenna 510, the BLE antenna 512) transmits an exit signal to the vehicle 100. At block 726, the command controller 116 causes the autonomy unit 114 to deactivate RePA for the vehicle 100. Further, at block 728, the command controller 116 causes the body control module 624 to enable the alert function corresponding with the alert button 310. Upon completing block 728, the method 700 returns to block 702.

Returning to block 708, the method 700 proceeds to block 730 in response to the processor 502 of the key fob 106 detecting that an input for RePA has not been received. At block 730, the processor 502 of the key fob 106 determines whether another input (e.g., for opening and/or closing a vehicle hatch, for emitting an alert, for opening and/or closing a vehicle window, etc.) a vehicle function of the vehicle 100 has been received. In response to the processor 502 of the key fob 106 detecting that another input for a vehicle function has not been received, the method 700 returns to block 702. Otherwise, in response to the processor 502 of the key fob 106 detecting that another input for a vehicle function has been received, the method 700 proceeds to block 732 at which an antenna of the key fob 106 (e.g., the UHF antenna 510, the BLE antenna 512) transmits a signal to the vehicle 100 for the vehicle function. Subsequently, a communication module of the vehicle 100 (e.g., the receiver-transceiver module 104, the antenna modules 112) receives the signal for the vehicle function from the key fob 106. At block 734, the command controller 116 causes the vehicle 100 to perform the vehicle function. Upon completing block 734, the method 700 returns to block 702.

An example disclosed key fob for a vehicle includes buttons including a lock button, an unlock button, and a trigger button. The example disclosed key fob also includes an antenna and a controller. The controller is configured to transmit, via the antenna, a lock signal responsive to detecting the lock button is pressed. The controller is configured to transmit, via the antenna, an unlock signal responsive to detecting the unlock button is pressed. The controller is configured to transmit, via the antenna, a remote-start signal responsive to detecting a remote-start combination of the buttons is pressed. The controller is configured to transmit, via the antenna, a remote park-assist (RePA) signal to initiate RePA of the vehicle responsive to detecting a RePA combination of the buttons is pressed.

In some examples, the remote-start combination includes a combination of pressing the lock button and the trigger button. In some such examples, the remote-start combination includes a sequence of pressing the lock button and subsequently pressing the trigger button a predefined number of times. In some examples, the RePA combination includes a combination of pressing the unlock button and the trigger button. In some such examples, the RePA combination includes a sequence of pressing the unlock button and subsequently pressing the trigger button a predefined number of times.

In some examples, upon initiating RePA, the controller is configured to transmit, via the antenna, a forward signal to instruct the vehicle to autonomously perform a forward motion for RePA responsive to detecting a forward combination of the buttons is pressed. In some such examples, the forward combination includes simultaneously holding the unlock button and another predefined button of the buttons. Further, in some such examples, the buttons includes an alert button and wherein the other predefined button includes the alert button. Moreover, in some such examples, the controller is configured to transmit, via the antenna, an alert signal responsive to detecting the alert button is pressed.

In some examples, upon initiating RePA for the vehicle, the controller is configured to transmit, via the antenna, a reverse signal to instruct the vehicle to autonomously perform a reverse motion for RePA responsive to detecting a reverse combination of the buttons is pressed. In some such examples, the reverse combination includes simultaneously holding the lock button and another predefined button of the buttons.

In some examples, when RePA is initiated, the controller is configured to transmit, via the antenna, an exit signal to instruct the vehicle to deactivate RePA responsive to detecting an exit combination of the buttons is pressed. In some examples, each of the buttons is labeled for both RePA functions and non-RePA functions.

An example disclosed vehicle system includes a vehicle. The vehicle includes an autonomy unit and a communication module. The example disclosed vehicle system also includes a key fob. The key fob includes buttons including a lock button and an unlock button, an antenna, and a controller. The controller is configured to transmit, via the antenna, a lock signal responsive to the lock button being pressed. The controller is configured to transmit, via the antenna, an unlock signal responsive to the unlock button being pressed. The controller is configured to transmit, via the antenna, a remote park-assist (RePA) signal to initiate the autonomy unit to perform RePA responsive to a RePA combination of the buttons being pressed.

In some examples, the vehicle includes a horn and the buttons of the key fob includes an alert button. In such examples, the controller is configured to transmit an alert signal via the antenna responsive to the alert button being pressed to cause the horn to emit an alert. In some such examples, the vehicle includes a command controller that is configured to prevent the horn from emitting the alert when RePA of the vehicle is initiated. In some such examples, the controller of the key fob is configured to send a forward signal responsive to the alert button and the lock button being pressed simultaneously. In such examples, the autonomy unit is to perform a forward motive function responsive to the communication module receiving the forward signal while RePA is initiated. Further, in some such examples, the controller of the key fob is configured to stop sending the forward signal responsive to the alert button and the lock button having stopped being pressed simultaneously. In such examples, the autonomy unit is to autonomously stop the vehicle when the communication module stops receiving the forward signal. Further, in some such examples, the controller of the key fob is configured to send a slow-stop signal responsive to the alert button being released before release of the lock button. In such examples, the autonomy unit is to gradually decelerate the vehicle to a stop when the communication module receives the slow-stop signal. Further, in some such examples, the controller of the key fob is configured to send a reverse signal responsive to the alert button and the unlock button being pressed simultaneously. In such examples, the autonomy unit is to perform a reverse motive function responsive to the communication module receiving the reverse signal while RePA is initiated.

An example disclosed method is for initiating vehicle functions utilizing a key fob that includes buttons. The example disclosed method includes, responsive to detecting, via a processor, that a lock button of the key fob is pressed, transmitting a lock signal via an antenna of the key fob. The example disclosed method includes, responsive to detecting, via the processor, that an unlock button of the key fob is pressed, transmitting an unlock signal via the antenna. The example disclosed method includes, responsive to detecting, via the processor, that a remote-start combination of the buttons is pressed, transmitting a remote-start signal via the antenna. The example disclosed method includes, responsive to detecting, via the processor, that a remote park-assist (RePA) combination of the buttons is pressed, transmitting a RePA signal via the antenna.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities. A "module" and a "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:
1. A key fob for a vehicle, the key fob comprising:
buttons including a lock button, an unlock button, and a trigger button;
an antenna; and
a controller configured to transmit, via the antenna:
a lock signal responsive to detecting the lock button is pressed;
an unlock signal responsive to detecting the unlock button is pressed;
a remote-start signal responsive to detecting a remote-start combination of the buttons is pressed;
a remote-start stop signal responsive to detecting the trigger button is pressed a first time;
a remote park-assist (RePA) signal to initiate RePA of the vehicle responsive to detecting a RePA combination of the buttons is pressed; and an exit signal to deactivate the RePA responsive to detecting that the trigger button is pressed a first predefined number of times, wherein the controller is further configured to receive a signal indicative of the RePA combination being pressed, the RePA combination comprising a combination of the unlock button and the trigger button.

2. The key fob of claim 1, wherein the controller is further configured to receive a signal indicative of the remote-start combination being pressed, the remote-start combination comprising a combination of the lock button and the trigger button.

3. The key fob of claim 2, wherein the controller is further configured to receive a signal indicative of a sequence indicative of the remote-start combination being pressed, and wherein the sequence comprises the lock button being pressed and subsequently the trigger button being pressed a second predefined number of times.

4. The key fob of claim 1, wherein the controller is further configured to receive a signal indicative of a sequence indicative of the RePA combination being pressed, and wherein the sequence comprises the unlock button being pressed and subsequently the trigger button being pressed a third predefined number of times.

5. The key fob of claim 1, wherein, upon initiating RePA, the controller is configured to transmit, via the antenna, a forward signal to instruct the vehicle to autonomously perform a forward motion for RePA responsive to detecting a forward combination of the buttons is pressed.

6. The key fob of claim 5, wherein the controller is further configured to receive a signal indicative of the forward combination being pressed, the signal further indicative of the unlock button and another predefined button of the buttons being simultaneously pressed.

7. The key fob of claim 6, wherein the buttons further include an alert button, wherein the other predefined button includes the alert button, and wherein the controller is configured to transmit, via the antenna, an alert signal responsive to detecting the alert button is pressed.

8. The key fob of claim 1, wherein, upon initiating RePA for the vehicle, the controller is configured to transmit, via the antenna, a reverse signal to instruct the vehicle to autonomously perform a reverse motion for RePA responsive to detecting a reverse combination of the buttons is pressed.

9. The key fob of claim 8, wherein the controller is further configured to receive a signal indicative of the reverse combination being pressed, the signal further indicative of the lock button and another predefined button of the buttons being simultaneously pressed.

10. The key fob of claim 1, wherein, when RePA is initiated, the controller is configured to transmit, via the antenna, the exit signal to instruct the vehicle to deactivate RePA responsive to detecting an exit combination of the buttons is pressed, the exit combination comprising the trigger button.

11. The key fob of claim 1, wherein each of the buttons is labeled for both RePA functions and non-RePA functions.

12. A vehicle system, comprising:
a vehicle including:
an autonomy unit; and
a communication module; and
a key fob including:
buttons including a lock button, and an unlock button, and a trigger button;
an antenna; and
a controller configured to transmit, via the antenna:

a lock signal responsive to the lock button being pressed;
an unlock signal responsive to the unlock button being pressed;
a remote-start signal responsive to detecting a remote-start combination of the buttons is pressed;
a remote-start stop signal responsive to detecting the trigger button is pressed a first time;
a remote park-assist (RePA) signal to initiate the autonomy unit to perform RePA responsive to a RePA combination of the buttons being pressed; and
an exit signal to deactivate the RePA responsive to detecting that at least the trigger button is pressed a first predefined number of times,
wherein the controller is further configured to receive a signal indicative of the RePA combination being pressed, the RePA combination comprising a combination of the unlock button and the trigger button.

13. The vehicle system of claim 12, wherein the vehicle includes a horn and the buttons of the key fob further include an alert button, wherein the controller is further configured to:
detect a signal indicative of the alert button being pressed to cause the horn to emit an alert; and
transmit an alert signal via the antenna responsive to the signal indicative of the alert button being pressed.

14. The vehicle system of claim 13, wherein the vehicle includes a command controller that is configured to prevent the horn from emitting the alert when RePA of the vehicle is initiated.

15. The vehicle system of claim 13, wherein the controller of the key fob is configured to send a forward signal responsive to detecting a signal indicative of the alert button and the unlock button being pressed simultaneously, wherein the autonomy unit is to perform a forward motive function responsive to the communication module receiving the forward signal while RePA is initiated.

16. The vehicle system of claim 15, wherein the controller of the key fob is configured to stop sending the forward signal responsive to a signal indicative of the alert button and the unlock button having stopped being pressed simultaneously, wherein the autonomy unit is to autonomously stop the vehicle when the communication module stops receiving the forward signal.

17. The vehicle system of claim 15, wherein the controller of the key fob is configured to send a slow-stop signal responsive to a signal indicative of the alert button being released before release of the unlock button, wherein the autonomy unit is to gradually decelerate the vehicle to a stop when the communication module receives the slow-stop signal.

18. The vehicle system of claim 15, wherein the controller of the key fob is configured to send a reverse signal responsive to a signal indicative of the alert button and the unlock button being pressed simultaneously, wherein the autonomy unit is to perform a reverse motive function responsive to the communication module receiving the reverse signal while RePA is initiated.

19. A method for initiating vehicle functions utilizing a key fob that includes buttons, the method comprising:
detecting, via a processor, that a lock button of the key fob is pressed;
transmitting, via the processor, a lock signal via an antenna of the key fob in response to detecting that the lock button of the key fob is pressed;

detecting, via the processor, that an unlock button of the key fob is pressed;
transmitting, via the processor, an unlock signal via the antenna in response to detecting that the unlock button of the key fob is pressed;
detecting, via the processor, that a remote-start combination of the buttons is pressed;
transmitting, via the processor, a remote-start signal via the antenna in response to detecting that the remote-start combination of the buttons is pressed;
detecting, via the processor, that a trigger button is pressed a first time;
transmitting, via the processor, a remote-start stop signal in response to detecting that the trigger button is pressed the first times;
detecting, via the processor, that a remote park-assist (RePA) combination of the buttons is pressed;
transmitting, via the processor, a RePA signal via the antenna in response to detecting that the RePA combination of the buttons is pressed;
detecting, via the processor, that at least the trigger button is pressed a predefined number of times; and
transmitting, via the processor, an exit signal to deactivate the RePA in response to detecting that at least the trigger button is pressed the predefined number of times.

* * * * *